(12) United States Patent
Mizutani et al.

(10) Patent No.: US 9,134,409 B2
(45) Date of Patent: Sep. 15, 2015

(54) VEHICLE-MOUNTED RADAR APPARATUS

(71) Applicants: DENSO CORPORATION, Kariya, Aichi-pref. (JP); Mazda Motor Corporation, Aki-gun, Hiroshima-pref. (JP)

(72) Inventors: Akiyoshi Mizutani, Nagoya (JP); Keiji Matsuoka, Nagoya (JP); Koji Shimizu, Ichinomiya (JP); Haruki Okazaki, Hiroshima (JP)

(73) Assignees: DENSO CORPORATION, Kariya (JP); Mazda Motor Corporation, Hiroshima-pref. (JP)

( * ) Notice: Subject to any disclaimer, the term of this patent is extended or adjusted under 35 U.S.C. 154(b) by 274 days.

(21) Appl. No.: 13/763,933

(22) Filed: Feb. 11, 2013

(65) Prior Publication Data
US 2013/0207832 A1 Aug. 15, 2013

(30) Foreign Application Priority Data
Feb. 13, 2012 (JP) .................... 2012-028567

(51) Int. Cl.
*G01S 13/58* (2006.01)
*G01S 13/06* (2006.01)
(Continued)

(52) U.S. Cl.
CPC ............... *G01S 13/58* (2013.01); *G01S 7/4026* (2013.01); *G01S 7/412* (2013.01); *G01S 13/06* (2013.01);
(Continued)

(58) Field of Classification Search
CPC ....... B01J 31/06; B01J 37/0217; G01S 13/06; G01S 13/58; G01S 13/584; G01S 13/931; G01S 2007/403; G01S 2013/9325; G01S 2013/9346; G01S 2013/935; G01S 2013/9353; G01S 7/4026; G01S 7/412
USPC ............................................ 342/70, 107, 146
See application file for complete search history.

(56) References Cited

U.S. PATENT DOCUMENTS 5,710,565 A 1/1998 Shirai et al.
6,147,637 A * 11/2000 Morikawa et al. ............... 342/70
(Continued)

FOREIGN PATENT DOCUMENTS

CN 1459029 11/2003
CN 1657971 8/2005
(Continued)

OTHER PUBLICATIONS

Office Action dated Sep. 2, 2014 in corresponding Chinese Application No. 201310051390.0.
(Continued)

*Primary Examiner* — Timothy A Brainard
(74) *Attorney, Agent, or Firm* — Harness, Dickey & Pierce, PLC

(57) ABSTRACT

A vehicle-mounted radar apparatus for transmitting radar waves in a forward traveling direction of a vehicle mounting the apparatus thereon (radar-mounting vehicle) and receiving the radar waves reflected from an object to acquire information about the object. In the apparatus, a target detection unit transmits and receives the radar waves to detect positions of targets. A representative target selection unit selects a representative target from the targets detected by the target detection unit. A same-object target selection unit selects targets belonging to the same object as the representative target. An object position determination unit calculates a value of a predefined function of lateral positions of two or more targets of all the targets selected by the same-object target selection unit as a lateral position, along a vehicle-width direction of the radar-mounting vehicle, of the specific reflecting object.

13 Claims, 11 Drawing Sheets

(51) Int. Cl.
*G01S 7/40* (2006.01)
*G01S 7/41* (2006.01)
*G01S 13/93* (2006.01)

(52) U.S. Cl.
CPC .............. *G01S 13/584* (2013.01); *G01S 13/931* (2013.01); *G01S 2007/403* (2013.01); *G01S 2013/935* (2013.01); *G01S 2013/9325* (2013.01); *G01S 2013/9346* (2013.01); *G01S 2013/9353* (2013.01)

(56) References Cited

U.S. PATENT DOCUMENTS

| | | | |
|---|---|---|---|
| 6,600,986 B2 * | 7/2003 | Steinle et al. | 701/70 |
| 7,761,236 B2 * | 7/2010 | Samukawa et al. | 701/301 |
| 2003/0142007 A1 | 7/2003 | Ono et al. | |
| 2005/0179581 A1 * | 8/2005 | Matsuura | 342/70 |

FOREIGN PATENT DOCUMENTS

| | | |
|---|---|---|
| JP | 08-279099 | 10/1996 |
| JP | 11-337635 | 12/1999 |
| JP | 2003-294838 | 10/2003 |
| JP | 2005-249743 | 9/2005 |

OTHER PUBLICATIONS

Office Action dated Mar. 17, 2015 in corresponding Japanese Application No. 2012-028567.

* cited by examiner

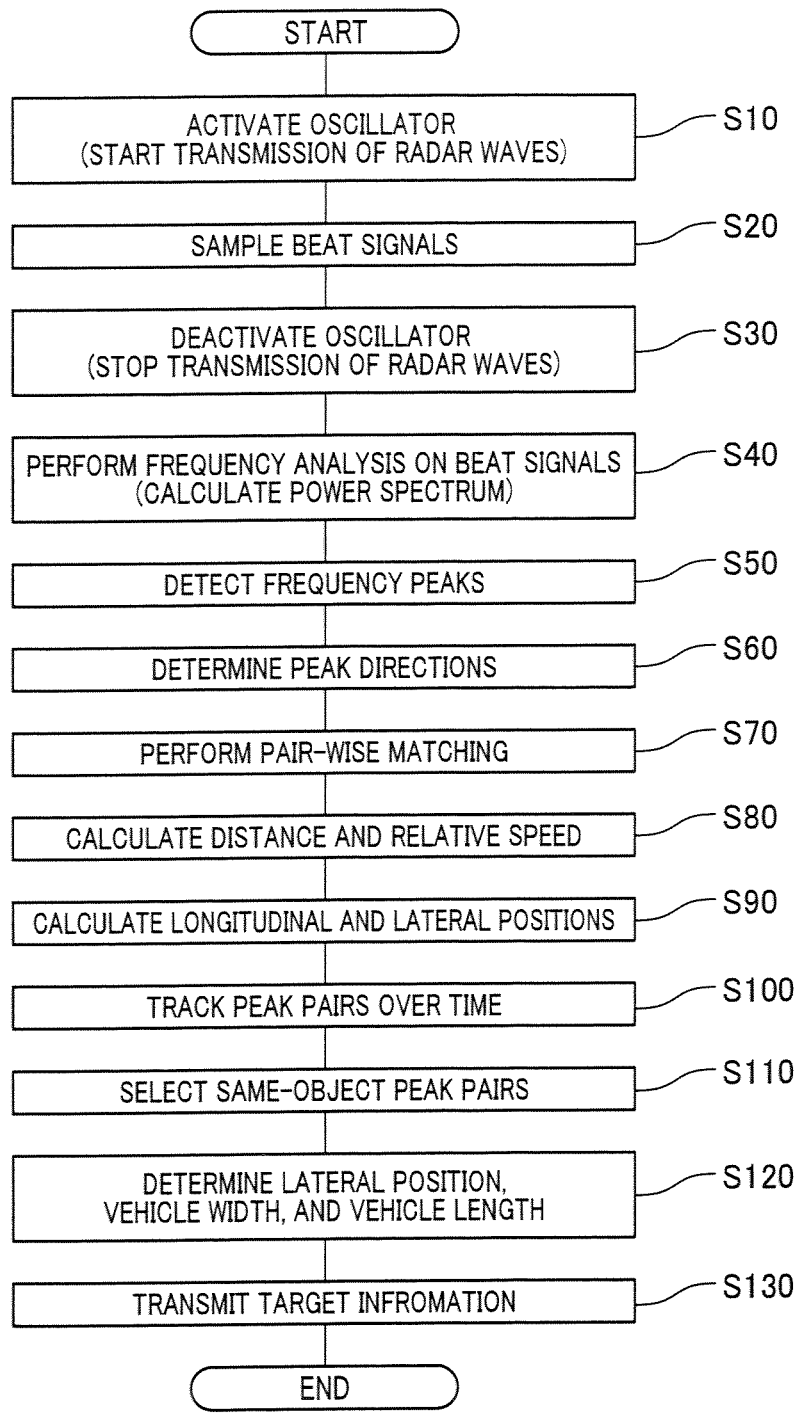

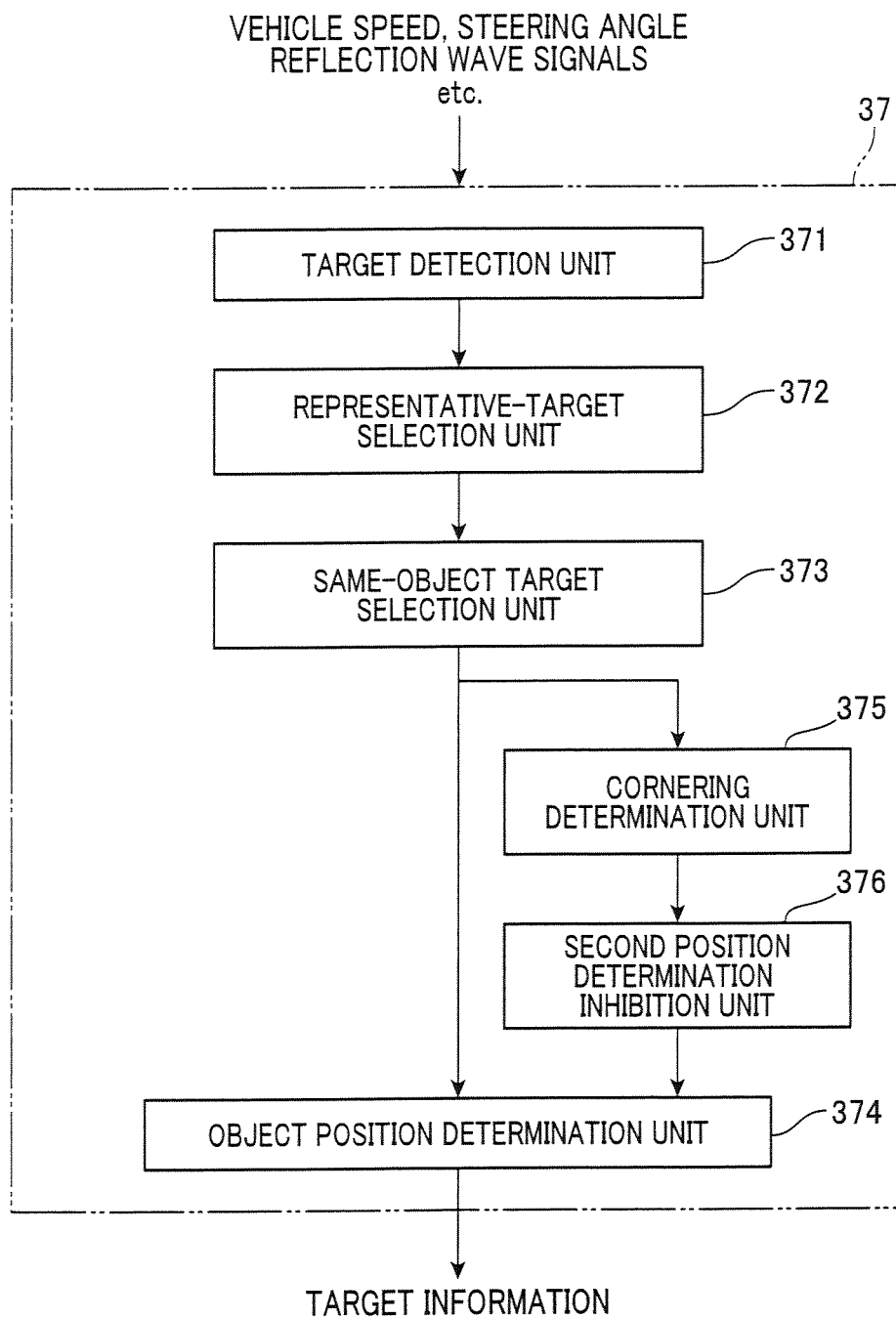

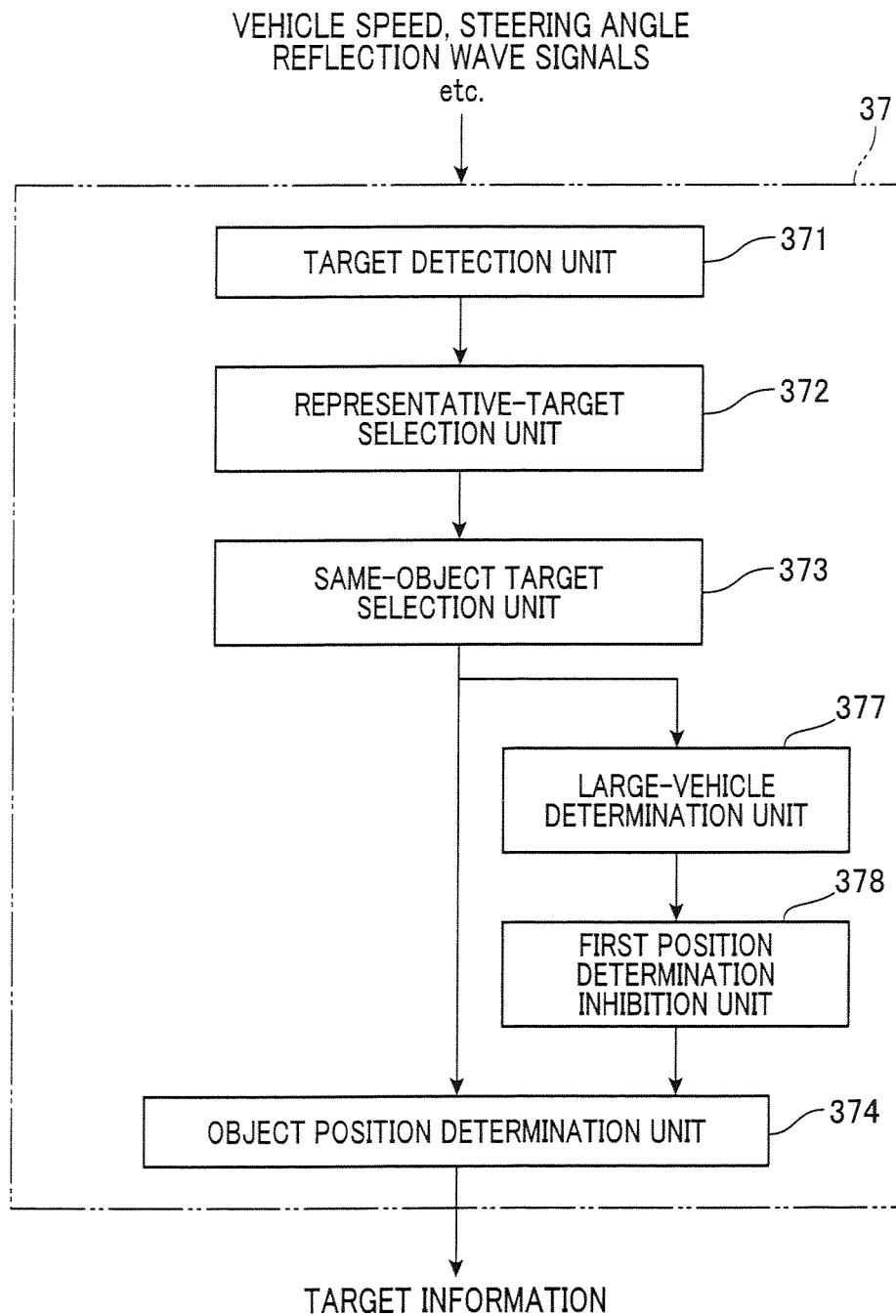

VEHICLE-MOUNTED RADAR APPARATUS

CROSS-REFERENCE TO RELATED APPLICATION

This application is based on and claims the benefit of priority from earlier Japanese Patent Application No. 2012-28567 filed Feb. 13, 2012, the description of which is incorporated herein by reference.

BACKGROUND

1. Technical Field

The present invention relates to a radar apparatus for transmitting and receiving radar waves to thereby detect an object reflecting the radar waves.

2. Related Art

A known vehicle-mounted radar apparatus transmits radar waves, such as laser waves or millimeter waves, with a predetermined scan angle every predetermined time interval and receives the radar waves reflected from an object around the vehicle mounting the radar apparatus thereon (hereinafter referred to as the own vehicle), thereby detecting the object around the own vehicle.

Such a vehicle-mounted radar apparatus is used in an automatic cruise control (ACC) system or the like adapted to detect a vehicle traveling ahead of the own vehicle in the same lane as the own vehicle (referred to as a preceding vehicle), and control a vehicle speed of the own vehicle so that a distance between the own vehicle and the preceding vehicle is maintained or kept constant.

To prevent a vehicle traveling in a lane other than the own lane (the lane in which the own vehicle is traveling) from being detected incorrectly as a preceding vehicle during cornering of the own vehicle, the ACC system mounted on the own vehicle, as disclosed in Japanese Patent Application Laid-Open Publication No. H08-27909, calculates a probability that a vehicle ahead of the own vehicle is traveling in the own lane on the basis of a curve radius of the own lane and a position of the vehicle traveling ahead of the own vehicle relative to the own vehicle, and on the basis of the calculated probability, determines whether or not the vehicle traveling ahead of the own vehicle is a preceding vehicle traveling in the own lane. In the ACC system, when it is determined that the vehicle traveling ahead of the own vehicle is a preceding vehicle, a distance between the preceding vehicle and the own vehicle is controlled to be maintained or kept constant.

The preceding vehicle may include not only reflection points on the rear portion of the preceding vehicle, but also reflection points in the interior of the preceding vehicle, as shown in FIG. 6A (where, for simplicity, only one reflection point on the rear portion is depicted and each of the other reflection points is in the interior or on a side portion of the preceding vehicle). The term "reflection point" refers to a point or spot from which radar waves are reflected. Mostly, a position of the preceding vehicle relative to the own vehicle is determined by using the reflection point(s) on the rear portion of the preceding vehicle.

As shown in FIG. 6B, however, a lateral position (a position along a width of the own vehicle) of the reflection point on the rear portion of the preceding vehicle may be off-centered even when the preceding vehicle is traveling straight. This is because, since the preceding vehicle is unable to travel completely straight, an aspect angle between the preceding vehicle and the own vehicle varies with time, or pitching of the own vehicle causes a back-and-forth rocking motion, the position of the reflection point on the rear portion of the preceding vehicle fluctuates due to the nature of millimeter waves.

In addition, during cornering of the preceding vehicle as shown in FIG. 6C, the lateral position of the reflection point on the rear portion of the preceding vehicle may be displaced in a cornering direction from the lateral position before the cornering. That is, the lateral position of the reflection point on the rear portion of the preceding vehicle may be displaced to the left for a left-hand curve or to the right for a right-hand curve. This is because, when the preceding vehicle is traveling straight, radar waves reflected from the center or its vicinity of the rear portion of the preceding vehicle will be detected by the own vehicle, and when the preceding vehicle is cornering to the left/right, radar waves reflected from a left/right edge of the rear portion of the preceding vehicle will be detected by the own vehicle.

As such, whether during traveling straight of the preceding vehicle or during cornering of the preceding vehicle, the detected position of the preceding vehicle may thus vary with time. Accordingly, the preceding vehicle traveling in the same lane as the own vehicle may be detected incorrectly as a vehicle traveling in a different lane.

In consideration of the foregoing, it would therefore be desirable to have a vehicle-mounted radar apparatus capable of reducing variations in detected position of a preceding vehicle.

SUMMARY

In accordance with an exemplary embodiment of the present invention, there is provided a vehicle-mounted radar apparatus for transmitting radar waves in a forward traveling direction of a vehicle mounting the apparatus thereon, the vehicle being hereinafter referred to as a radar-mounting vehicle, and receiving the radar waves reflected from an object to acquire information about the object. In the apparatus, a target detection unit transmits and receives the radar waves to detect positions of targets reflecting the radar waves.

The term "target", here, refers to a reflection point on or in the object, from which a radar wave is reflected. A plurality of targets reflecting the radar waves may be detected from one object.

In addition, in the apparatus of the embodiment, a representative target selection unit selects one of the targets detected by the target detection unit that fulfills a predetermined representative-target designation condition for designating a representative of the targets detected by the target detection unit. A same-object target selection unit selects, from the targets detected by the target detection unit, targets that fulfill a predetermined same-object target selection condition for determining which of the targets detected by the target detection unit belongs to the same object as the representative target. The representative target and the targets selected by the same-object target selection unit other than the representative target forms together a same-object target group. The object that each target of the same-object target group belongs to is referred to as a specific reflecting object.

The representative-target designation condition may state that the representative target is a target located closest to the own vehicle (radar-mounting vehicle). The same-object target selection condition may state that a target belonging to the same object as the representative target is a target having a distance from the representative target less than a threshold distance value, the predetermined same-object target selection condition comprises at least one of: a first condition that a difference in distance from the radar-mounting vehicle between the target and the representative target is equal to or less than a predetermined threshold value of distance difference; a second condition that a difference in peak direction from the radar-mounting vehicle between the target and the representative target is equal to or less than a predetermined threshold value of peak direction difference; and a third condition that a difference in relative speed from the radar-mounting vehicle between the target and the representative target is equal to or less than a predetermined threshold value of relative speed difference.

In the apparatus of the embodiment, an object position determination unit calculates a value of a predefined function of lateral positions of two or more targets of the same-object target group as a lateral position, along a vehicle-width direction of the radar-mounting vehicle, of the specific reflecting object.

Preferably, the object position determination unit selects, from the targets of the same-object target group, a rightmost target as viewed from the radar-mounting vehicle and a leftmost target as viewed from the radar-mounting vehicle, and calculates a center of a lateral position of the rightmost target and a lateral position of the leftmost target as the lateral position of the specific reflecting object.

The radar apparatus configured as above uses two targets of the same-object target group, that is, the leftmost and rightmost targets, to calculate the lateral position of the specific reflecting object.

A lateral position of a target in the interior of the specific reflecting object is likely to lie at or around the lateral center of the specific reflecting object, i.e., the center of the width of the specific reflecting object. Hence, even though one of the rightmost and leftmost peak targets is a target on the specific reflecting object and the other is a target in the interior of the specific reflecting object (such a situation is likely to occur during cornering of the specific reflecting object), the lateral position of the specific reflecting object is allowed to remain closer to the lateral center of the specific reflecting object as compared to the lateral position of the specific reflecting object simply defined by the lateral position of the representative target. The lateral position of the preceding vehicle is thus corrected.

Hence, in spite of large variations in lateral position of a target on the rear portion of the specific reflecting object, variations in lateral position of the specific reflecting object calculated as above can be reduced, which leads to reduction of variations in detected position of the specific reflecting object.

When the specific reflecting object is a large vehicle, a vehicle width is greater than that of a mid-size car or a normal-size car, which leads to larger variations in lateral position of the target on the rear portion of the specific reflecting object.

Variations in lateral position of the preceding vehicle (specific reflecting object) can be problematic when the preceding vehicle is a large vehicle, while variations in lateral position of the preceding vehicle may often be ignorable when the preceding vehicle is a non-large vehicle, such as a mid-size car or a normal-size car.

Hence, preferably in the apparatus, a large-vehicle determination unit determines whether or not the specific reflecting object is a large vehicle, and a first position determination inhibition unit, when it is determined by the large-vehicle determination unit that the specific reflecting object is not a large vehicle (that is, the specific reflecting object is a non-large vehicle), inhibits the object position determination unit from calculating the predefined function of lateral positions of two or more targets of the same-object target group as the lateral position of the specific reflecting object.

In some embodiments, the object position determination unit, when inhibited by the first inhibition unit, may determine a lateral position of the representative target as the lateral position of the specific reflecting object.

This, in an environment where variations in lateral position of the preceding vehicle (specific reflecting object) are ignorable due to the preceding vehicle being a non-large vehicle, such as a mid-size car or normal size car, can inhibit unnecessary calculation of the lateral position of the preceding vehicle.

In an alternative embodiment, the object position determination unit determines a mean of lateral positions of all the targets of the same-object target group as the lateral position of the specific reflecting object.

In the apparatus of this alternative embodiment, the lateral position of the specific reflecting object may be calculated by using not only targets on the rear portion of the specific reflecting object, but also targets in the interior of the specific reflecting object.

In addition, a lateral position of a target in the interior of the specific reflecting object is likely to lie at or around the lateral center of the specific reflecting object, i.e., the center of the width of the specific reflecting object. Hence, even though one of the rightmost and leftmost peak targets is a target on the specific reflecting object and the other is a target in the interior of the specific reflecting object (such a situation is likely to occur during cornering of the specific reflecting object), the lateral position of the specific reflecting object is allowed to remain closer to the lateral center of the specific reflecting object as compared to the lateral position of the specific reflecting object simply defined by the lateral position of the representative target. The lateral position of the preceding vehicle is thus corrected.

Hence, in spite of large variations in lateral position of a target on the rear portion of the specific reflecting object, variations in lateral position of the specific reflecting object calculated as above can be reduced, which leads to reduction of variations in detected position of the specific reflecting object.

Preferably, the object position determination unit determines a weighted mean of lateral positions of all the targets of the same-object target group as the lateral position of the specific reflecting object. The weighted mean is determined by using, as weights, magnitudes of reflection wave received powers for the respective targets of the same-object target group.

With this configuration, the detected lateral position of the preceding vehicle may reflect the magnitudes of the reflection wave received powers for the respective same-object targets.

Preferably, a large-vehicle determination unit determines whether or not the specific reflecting object is a large vehicle, and a first position determination inhibition unit, when it is determined by the large-vehicle determination unit that the specific reflecting object is not a large vehicle, inhibits the object position determination unit from calculating the mean or the weighted mean of lateral positions of all the targets of the same-object target group as the lateral position of the specific reflecting object.

In some embodiments, the object position determination unit, when inhibited by the first inhibition unit, determines a lateral position of the representative target as the lateral position of the specific reflecting object.

This, in an environment where variations in lateral position of the preceding vehicle (specific reflecting object) are ignorable due to the preceding vehicle being a non-large vehicle, such as a mid-size car or normal size car, can inhibit unnecessary calculation of the lateral position of the preceding vehicle.

Alternatively, in the apparatus, a cornering determination unit determines whether or not the radar-mounting vehicle is cornering. the object position determination unit, when it is determined by the cornering determination unit that the radar-mounting vehicle is cornering, calculates a value of the predefined function as the lateral position of the specific reflecting object, the function being defined such that the lateral position of the specific reflecting object is displaced in a direction opposite to a cornering direction from a lateral position of the representative target.

With this configuration, even when a lateral position of the target on the rear portion of the specific reflecting object varies in the cornering direction during cornering, the lateral position of the specific reflecting object is corrected to a lateral position displaced in a direction opposite to the cornering direction, which leads to reduction of variations in detected position of the specific reflecting object during cornering.

Preferably, the object position determination unit, when it is determined by the cornering determination unit that the radar-mounting vehicle is cornering, extracts, from the targets of the same-object group, an endmost target along a lateral direction opposite to a cornering direction of the radar-mounting vehicle, and further calculates a center of a lateral position of the representative target and a lateral position of the endmost target as the lateral position of the preceding vehicle.

In this alternative embodiment, the endmost target in the lateral direction opposite to the cornering direction of the specific reflecting object as viewed from the own vehicle is extracted from all the targets of the same-object target group. The lateral position of the specific reflecting object (for example, given by the lateral position of the representative target) is thus simply corrected to the center of the lateral position of the representative target and the lateral position of the endmost target.

Preferably, in the apparatus, a large-vehicle determination unit determines whether or not the specific reflecting object is a large vehicle, and a cornering determination inhibition unit, when it is determined by the large-vehicle determination unit that the specific reflecting object is not a large vehicle, inhibits the cornering determination unit from determining whether or not the radar-mounting vehicle (own vehicle) is cornering.

This, in an environment where variations in lateral position of the preceding vehicle are ignorable due to the preceding vehicle being a non-large vehicle, such as a mid-size car or a normal-size car, can inhibit unnecessary calculation of the lateral position of the preceding vehicle.

Preferably, the large-vehicle determination unit determines whether or not a number of targets of the same-object target group is equal to or greater than a predetermined threshold target number for large-vehicle determination, and when it is determined that the number of targets of the same-object target group is equal to or greater than the predetermined threshold target number for large-vehicle determination, determines that the specific reflecting object is a large vehicle.

Alternatively or additionally, the large-vehicle determination unit determines whether or not a reflection wave received power for one of the targets of the same-object target group that fulfills a predetermined target selection condition for selecting a target used by the large-vehicle determination unit to determine whether or not the specific reflecting object is a large vehicle is equal to or greater than a predetermined threshold received power for large-vehicle determination, and when it is determined that the reflection wave received power for the target that fulfills the predetermined target selection condition is equal to or greater than the predetermined threshold received power for large-vehicle determination, determines that the specific reflecting object is a large vehicle. The predetermined target selection condition may state that the target used by the large-vehicle determination unit to determine whether or not the specific reflecting object is a large vehicle is a target, of the same-object target group, having a maximum frequency-peak intensity in a power spectrum of reflection waves.

BRIEF DESCRIPTION OF THE DRAWINGS

In the accompanying drawings:

FIG. 2B shows a flowchart of a target information generation process performed in the signal processor in accordance with each of the first to third embodiments of the present invention;

FIG. 3A shows a schematic block diagram of a signal processor of the radar apparatus in accordance with a fourth embodiment of the present invention;

FIG. 5A shows a schematic block diagram of a signal processor of the radar apparatus in accordance with each of fifth to seventh embodiments of the present invention;

DESCRIPTION OF SPECIFIC EMBODIMENTS

The present inventions will be described more fully hereinafter with reference to the accompanying drawings. Like numbers refer to like elements throughout.

First Embodiment

Figure 1:
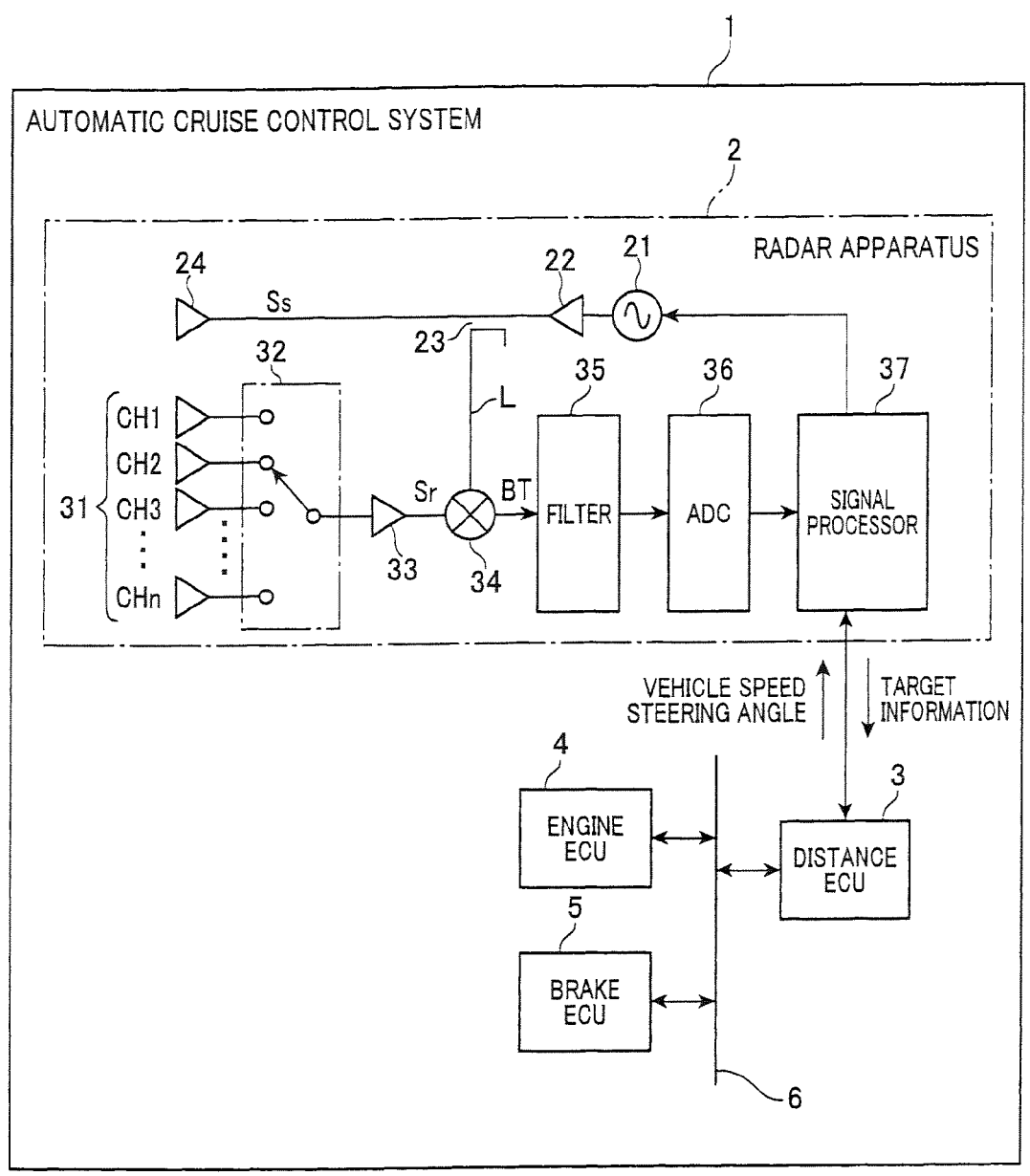
FIG. 1 shows a schematic block diagram of an automatic cruise control system including a radar apparatus in accordance with various embodiments of the present invention.

FIG. 1 shows a schematic block diagram of an automatic cruise control system 1 in accordance with a first embodiment of the present invention.

The automatic cruise control system 1 is mounted on a vehicle and includes, as shown in FIG. 1, a radar apparatus 2, a distance electronic control unit (distance ECU) 3, an engine electronic control unit (engine ECU) 4, a brake electronic control unit (brake ECU) 5. The ECUs 3, 4, 5 are connected to each other via an in-vehicle local area network 6 and thereby allowed to output and receive data.

The radar apparatus 2 in the form of a so-called millimeter wave radar of FMCW type detects an object, such as a preceding vehicle or a roadside object, by transmitting and receiving millimeter radar waves, generates target information about a preceding vehicle traveling ahead of the own vehicle on the basis of the detections, and sends the target information to the distance ECU 3. The target information includes at least a speed and a position of the preceding vehicle relative to the own vehicle.

The brake ECU 5 determines a brake pedal state on the basis of not only detection information (a steering angle and/or a yaw rate) received from a steering sensor (not shown) and/or a yaw rate sensor (not shown), but also detection information received from a master cylinder (MC) pressure sensor, and sends the determined brake pedal state to the distance ECU 3. Further, the brake ECU 5 receives information including a target acceleration and a braking request from the distance ECU 3, and in response to the received information and the determined brake pedal state, drives a brake actuator that opens and closes a pressure increasing control valve and a pressure reducing control valve involved in a brake hydraulic circuit to thereby control a braking force.

The engine ECU 4 sends to the distance ECU 3 detection information including a vehicle speed, a controlled state of the engine, and an operated state of the accelerator received from a vehicle speed sensor (not shown), a throttle position sensor (not shown), an accelerator pedal position sensor (not shown), respectively. The engine ECU 4 receives from the distance ECU 3 information including a target acceleration and a fuel-cut request, and outputs an actuation command to a throttle actuator that adjusts a throttle position of the internal-combustion engine in response to an operating condition specified from the received information.

The distance ECU 3 receives a vehicle speed and a controlled state of the engine and the like from the engine ECU 4 and receives a steering angle, a yaw rate, a controlled state of the brake and the like from the brake ECU 5. In addition, on the basis of setting values set via an cruise control switch (not shown) and a target distance setting switch (not shown) and the like, as well as the target information received from the radar apparatus 2, the distance ECU 3 sends a target acceleration and a fuel-cut request and the like to the engine ECU 4 and sends the target acceleration and a braking request and the like to the brake ECU 5, as control commands for maintaining a suitable distance between the own vehicle and the preceding vehicle.

The radar apparatus 2 will now be explained in detail.

The radar apparatus 2 includes an oscillator 21 that generates a radio-frequency (RF) signal in a millimeter waveband modulated in frequency by a modulation signal with each cycle having an ascent interval in which the frequency of modulation signal is linearly increasing with time and a descent interval in which the frequency of modulation signal is linearly decreasing with time, an amplifier 22 that amplifies the radio-frequency signal generated in the oscillator 21, a power distributor 23 that splits an output of the amplifier 22 into a transmit signal Ss and a local signal L, a transmit antenna 24 that emits a radar wave in response to the transmit signal Ss, and multiple receive antennas 31 including n (where n is a positive integer) receive antennas for receiving the radar wave (for example, in the form of an array antenna).

The radar apparatus 2 further includes a receive switch 32 that sequentially selects the multiple receive antennas 31 and forwards a received signal Sr from selected one of the receive antennas for further processing, an amplifier 33 that amplifies a received signal Sr from the receive switch 32, a mixer 34 that mixes the received signal Sr amplified by the amplifier 33 with the local signal L to generate a beat signal BT, a filter 35 that removes unnecessary signal components from the beat signal BT generated in the mixer 34, an analog-to-digital converter (ADC) 36 that samples an output of the filter 35 to convert the beat signal BT into digital data, and a signal processor 37 that controls the operation of the oscillator 21 (e.g., activation and deactivation) and the sampling of the beat signal BT via the ADC 36, performs the signal analysis by using the sampled data, and communicates with the distance ECU 3 to receive information necessary for the signal analysis (including a vehicle speed and a steering angle and the like) and transmit information resulting from the signal analysis (including the target information and the like).

The multiple receive antennas 31 are configured such that a beam width of each antenna is greater than the beam width of the transmit antenna 24. The multiple receive antennas 31 are respectively associated with the channels CH1 to CHn.

The signal processor 37 is built around a well-known microcomputer. The signal processor 37 further includes a processor which performs a fast Fourier transform (FFT) on data acquired via the ADC 36, such as a digital signal processor (DSP).

In the radar apparatus 2 configured as above, once the oscillator 21 is activated in response to an instruction from the signal processor 37, the oscillator 21 generates a radio-frequency signal, which is in turn amplified by the amplifier 22. Subsequently, the radio-frequency signal is split into a transmit signal Ss and a local signal L. The transmit signal Ss is transmitted as a radar wave via the transmit antenna 24.

A reflected wave from an object is received by each of the multiple receive antennas 31. Only a received signal Sr of one of the receive channels CHi (i=1 to n) selected by the receive switch 32 is amplified by the amplifier 33 and then fed to the mixer 34. The mixer 34 mixes the received signal Sr with the local signal L to generate a beat signal BT. After unnecessary signal components are removed from the beat signal BT by the filter 35, the beat signal BT is sampled by the ADC 36. The sampled data is then fed to the signal processor 37.

The receive switch 32 sequentially and cyclically selects all the receive channels CH1 to CHn at a predetermined switching frequency. For example, each of the receive channels CH1 to CHn is selected 512 times for each modulation cycle of the radar wave. The ADC 36 samples the received signal Sr in synchrony with the switching timings of the receive switch 32. That is, for each of the receive channels CH1 to CHn, the sampled data will be accumulated for each of the ascent and descent intervals of each modulation cycle of the radar wave.

The signal processor 37 of the radar apparatus 2 performs the signal analysis after the passage of every modulation cycle of the radar wave, where, for each of the receive channels CH1 to CHn, the signal processor 37 subjects the accumulated data for each of ascent and descent intervals to FFT processing, and then performs a target information generation process, where the signal processor 37 detects a preceding object and generates target information about the preceding vehicle by using information resulting from the signal analysis. Since the signal analysis is a well-known technique, it will not be explained here in detail.

Figure 2A:
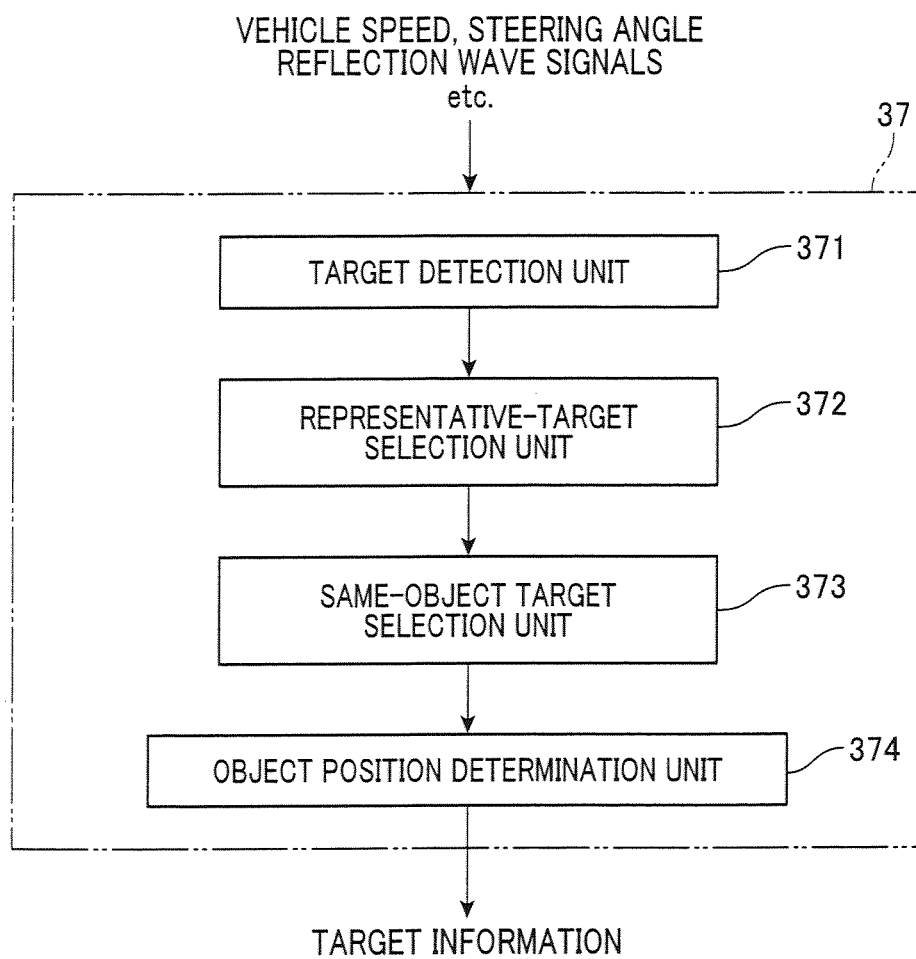
FIG. 2A shows a schematic block diagram of a signal processor of the radar apparatus in accordance with each of first to third embodiments of the present invention.

As shown in FIG. 2A, the signal processor 37 of the radar apparatus 2 includes a target detection unit 371, a representative target selection unit 372, a same-object target selection unit 373, and an object position determination unit 374. The operations of these components will be explained later.

The target information generation process performed in the signal processor 37 will now be explained with reference to FIG. 2B. FIG. 2B shows a flowchart of the target information generation process. The target information generation process is performed repeatedly every time the fast Fourier transformation (FFT) processing on sampled data for one modulation cycle is completed.

First, in step S10, the signal processor 37 activates the oscillator 21 to start transmission of radar waves. Subsequently, in step S20, the signal processor 37 samples the beat signals BT outputted from the ADC 36 during one modulation cycle having an ascent interval in which the modulation signal frequency gradually increases with time and a descent interval in which the modulation signal frequency gradually decreases with time. In step S30, the signal processor 37 deactivates the oscillator 21 to stop the transmission of radar waves.

Subsequently, in step S40, the signal processor 37 subjects the sampled data acquired in step S20 to the frequency analysis (e.g., FFT processing in the present embodiment) to determine, for each of the receive channels CH1 to CHn, a power spectrum of the beat signal BT for each of the ascent and descent intervals. The power spectrum plots an intensity (power spectrum intensity) for each of frequency constituents of the beat signal BT.

Figure 6A:
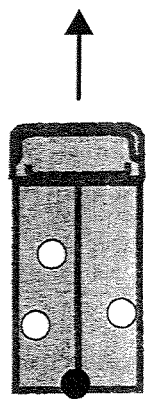
FIG. 6A shows an example of reflection points of a preceding vehicle during traveling completely straight.
Figure 6B:
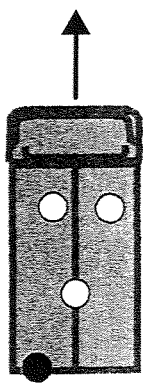
FIG. 6B shows an example of reflection points of the preceding vehicle during traveling substantially straight.
Figure 6C:
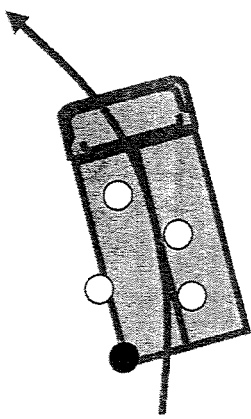
FIG. 6C shows an example of reflection points of the preceding vehicle during cornering.

In step S50, for each of the receive channels CH1 to CHn, the signal processor 37 detects frequency peaks fbu-1 to fbu-m (m: a positive integer) present in the power spectrum for the ascent interval and frequency peaks fbd-1 to fbd-m present in the power spectrum for the descent interval. Each of the detected frequency peaks fbu, fbd corresponds to a candidate for target (hereinafter referred to as a target candidate). The term "target" here refers to a reflection point of the object, from which point radar waves are reflected. A plurality of target candidates may be detected from one object, as shown in FIGS. 6A to 6C.

More specifically, in step S50, the signal processor 37 calculates an arithmetic mean of the power spectra for the respective receive channels CH1 to CHn to determine a mean spectrum. The signal processor 37 detects all frequencies at which the mean spectrum exhibits a peak intensity above a predetermined threshold (referred to as frequency peaks), thereby detecting the frequency peaks fbu-1 to fbu-m for the ascent interval and the frequency peaks fbd-1 to fbd-m for the descent interval.

Further, in step S60, the signal processor 37 detects, for each of the detected frequency peaks fbu, fbd, a direction of the target candidate corresponding to the frequency peak relative to the own vehicle (hereinafter referred to as a peak direction) on the basis of phase differences among beat signal components of the same peak frequency acquired via the respective receive channels CH1 to CHn by using the digital beam forming technique or the like.

Thereafter, in step S70, the signal processor 37 performs pair-wise matching on all the detected frequency peaks fbu, fbd to detect all pairs of frequency peaks fbu, fbd such that the frequency peaks fbu, fbd in each pair correspond to the same target candidate. More specifically, in the pair-wise matching, it is determined whether or not a difference in peak intensity and a difference in peak angle for each pair of detected frequency peaks fbu and fbd are both within respective predetermined acceptable range. Each pair of detected frequency peaks fbu, fbd, whose peak intensity difference and peak angle difference are both within the respective predetermined acceptable range, is registered as a peak pair.

In step S80, for each registered peak pair, the signal processor 37 calculates a distance between the radar apparatus 2 of the own vehicle and the target candidate corresponding to the registered peak pair and a speed of the target candidate corresponding to the registered peak pair relative to the own vehicle (also referred to as a relative speed) by using a well-known technique available in the FMCW-based radar apparatus 2.

In step S90, for each registered peak pair, the signal processor 37 calculates longitudinal and lateral positions of the target candidate corresponding to the registered peak pair on the basis of the peak direction of the target candidate relative to the own vehicle calculated in step S60 and the distance of the target candidate relative to the own vehicle calculated in step S80. The longitudinal position of the target candidate is a position of the target candidate relative to the own vehicle along the travelling direction of the own vehicle. The lateral position of the target candidate is a position of the target candidate relative to the own vehicle along the vehicle width direction of the own vehicle. The longitudinal and lateral positions and the relative speed of the target candidate are determined in this way for each registered peak pair.

Subsequently, in step S100, for each peak pair registered in the current measurement cycle (hereinafter referred to as a current cycle pair), the signal processor 37 tracks the peak-pair to check for traceability, where it is determined whether or not a target candidate corresponding to the current cycle pair is identified as one of target candidates corresponding to the respective peak pairs registered in the previous measurement cycle (hereinafter each referred to as a previous cycle pair).

More specifically, for each previous cycle pair, the signal processor 37, on the basis of information about the previous cycle pair including longitudinal and lateral positions, a relative speed, and a peak direction of the previous cycle pair calculated in the previous measurement cycle, predicts longitudinal and lateral positions and a relative speed of the previous cycle pair in the current measurement cycle. The signal processor 37 then determines whether or not there exists a current cycle pair such that a difference between the predicted longitudinal position of the previous cycle pair and a detected longitudinal position of the current cycle pair is less than a predetermined upper limit longitudinal position difference, a difference between the predicted lateral position of the previous cycle pair and a detected lateral position of the current cycle pair is less than a predetermined upper limit lateral position difference, and a difference between the predicted relative speed of the previous cycle pair and a detected relative speed of the current cycle pair is less than a predetermined upper limit relative speed difference. If it is determined that the longitudinal position difference, the lateral position difference, and the relative speed difference are less than the upper limit longitudinal position difference, the upper limit lateral position difference, and the upper limit relative speed difference, respectively, then it is determined that the current cycle pair is traceable back to the previous cycle pair. When it has already been determined in a similar manner that the previous cycle pair is traceable back to a cycle pair registered in one preceding cycle, the current cycle pair is traceable back to the cycle pair registered in two preceding cycle through the previous cycle pair. In general, it can be determined whether or not the current cycle pair is traceable back to a registered peak pair in N (where N is a positive integer) preceding cycle through N−1 intermediate cycle pairs. In the present embodiment, when a registered peak pair in one measurement cycle is traceable back to a registered pair in five or more preceding cycle through four or more intermediate registered pairs, it is identified as a target.

Subsequently, in step S110, on the basis of the peak direction calculated in step S60 and the distance and the relative speed calculated in step 80 for each peak pair registered in step S70, the signal processor 37 selects, from the peak pairs identified as a target in step S100, peak pairs belonging to (or arising from) a specific reflecting object (that is, a specific object reflecting the radar waves), which fulfill a predetermined same-object target selection condition. A peak pair that fulfills the same-object target selection condition is referred to as a same-object peak pair. All the same-object peak pairs form a same-object peak pair group.

The same-object target selection condition, in the present embodiment, may state that, given a representative peak pair that is a peak pair corresponding to a target closest to the own vehicle, a peak pair belonging to the same object as the representative target is a peak pair having a difference in distance relative to (or from) the own vehicle between the peak pair and the representative peak pair equal to or less than a predetermined threshold value of distance difference, a difference in peak direction relative to (or from) the own vehicle between the peak pair and the representative peak pair equal to or less than a predetermined threshold value of peak direction difference, and a difference in speed relative to (or from) the own vehicle (relative speed) between the peak pair and the representative peak pair equal to or less than a predetermined threshold value of relative speed difference. The representative peak pair itself also fulfills the same-object target selection condition.

In step S120, the signal processor 37 extracts, on the basis of lateral positions of the peak pairs calculated in step S90, a rightmost peak pair as viewed from the own vehicle and a leftmost peak pair as viewed from the own vehicle from the same-object peak pairs selected in step S110, and determines a center of the lateral position of the rightmost peak pair and the lateral position of the leftmost peak pair as a lateral position of the preceding vehicle (preceding vehicle position). Further, in step S120, the signal processor 37 determines a difference in lateral position between the rightmost peak pair and the leftmost peak pair as a width of the preceding vehicle. Still further, in step S120, the signal processor 37 extracts, on the basis of longitudinal positions of the peak pairs calculated in step S90, a forwardmost peak pair and a rearmost peak pair from the same-object peak pairs selected in step S110, and determines a difference in longitudinal position between the forwardmost peak pair and the rearmost peak pair as a length of the preceding vehicle.

Subsequently, in step S130, the signal processor 37 generates target information including at least speed information indicative of a speed of the preceding vehicle relative to the own vehicle (relative speed), lateral position information indicative of the lateral position of the preceding-vehicle, width information indicative of the width of the preceding-vehicle, length information indicative of the length of the preceding-vehicle, distance information indicative of the distance from the own vehicle to the representative peak pair, and sends the target information to the distance ECU 3. The process of this cycle is then ended.

Referring again to FIG. 2A, the operations of the target detection unit 371, the representative-target selection unit 372, the same-object target selection unit 373, the object position determination unit 374 will now be explained following the flow of the flowchart shown in FIG. 2B.

In the radar apparatus 2 configured as above, the target detection unit (as target detection means) 371 is responsible for the operation in step S90, where positions of targets reflecting radar waves emitted from the apparatus 2 (corresponding to respective peak pairs) are detected from the radar waves reflected from the targets.

The representative-target selection unit (as representative-target selection means) 372 is responsible for selecting the representative peak pair, i.e., a peak pair corresponding to a target closest to the own vehicle, from the peak pairs identified as a target in step S100.

The same-object target selection unit (as same-object target selection means) 373 is responsible for the operation in step S110, where peak pairs that fulfill the predetermined same-object target selection condition defined as above utilizing the representative peak pair selected by the representative-target selection unit 372 are selected from the peak pairs identified as a target in step S100.

The object position determination unit (as object position determination means) 374 is responsible for the operation in step S120, where the rightmost peak pair as viewed from the own vehicle and the leftmost peak pair as viewed from the own vehicle are extracted from the peak pairs extracted by the same-object target selection unit 373 (i.e., from the same-object peak pairs), and a center of the lateral position of the rightmost peak pair and the lateral position of the leftmost peak pair is determined as a lateral position of the preceding vehicle.

A lateral position of a target (corresponding to a peak pair) in the interior of the preceding vehicle is likely to lie at or around the lateral center of the preceding vehicle, i.e., the center of the width of the preceding vehicle. Hence, even though one of the rightmost and leftmost peak pairs is a target on the rear portion of the preceding vehicle and the other is a target in the interior of the preceding vehicle (such a situation is likely to occur during cornering of the preceding vehicle), the lateral position of the preceding vehicle calculated in step S120 is allowed to remain closer to the lateral center of the preceding vehicle as compared to the lateral position of the preceding vehicle simply defined by the lateral position of the representative peak pair. The lateral position of the preceding vehicle is thus corrected.

Hence, in spite of large variations in lateral position of a target on the rear portion of the preceding vehicle, variations in lateral position of the preceding vehicle calculated in step S120 can be reduced, which leads to reduction of variations in detected preceding vehicle position.

Second Embodiment

There will now be explained a second embodiment of the present invention with reference to FIGS. 2A, 2B. Only differences of the second embodiment from the first embodiment will be explained.

The automatic cruise control system 1 of the second embodiment is similar to the automatic cruise control system 1 of the first embodiment except that the object position determination unit 374 and the operation in step S120 of the target information generation process are modified.

In the present embodiment, the signal processor 37, in step S120 of the target information generation process, determines a mean of lateral positions of all the same-object peak pairs selected in step S110 as a lateral position of the preceding vehicle. As in step S120 of the target information generation process of the first embodiment, the signal processor 37, in step S120, further determines a difference in lateral position between the rightmost peak pair and the leftmost peak pair as a width of the preceding vehicle. Still further, in step S120, the signal processor 37 extracts, on the basis of longitudinal positions of the peak pairs calculated in step S90, the forwardmost peak pair and the rearmost peak pair from the same-object peak pairs selected in step S110, and determines a difference in longitudinal position between the forwardmost peak pair and the rearmost peak pair as a length of the preceding vehicle. Thereafter, the process proceeds to step S130.

The object position determination unit 374, also in the present embodiment, is responsible for the operation in step S120 of the target information generation process.

In the radar apparatus 2 configured as above, not only targets on the rear portion of the preceding vehicle, but also targets in the interior of the preceding vehicle are used to calculate the lateral position of the preceding vehicle.

As described above, a lateral position of a target (corresponding to a peak pair) in the interior of the preceding vehicle is likely to lie at or around the lateral center of the preceding vehicle, i.e., the center of the width of the preceding vehicle. Hence, even though one of the rightmost and leftmost peak pairs is a target on the rear portion of the preceding vehicle and the other is a target in the interior of the preceding vehicle (such a situation is likely to occur during cornering of the preceding vehicle), the lateral position of the preceding vehicle calculated in step S120 is allowed to remain closer to the lateral center of the preceding vehicle as compared to the lateral position of the preceding vehicle simply defined by the lateral position of the representative peak pair. The lateral position of the preceding vehicle is thus corrected.

Hence, in spite of large variations in lateral position of a target on the rear portion of the preceding vehicle, variations in lateral position of the preceding vehicle calculated in step S120 can be reduced, which leads to reduction of variations in detected preceding vehicle position.

Third Embodiment

There will now be explained a third embodiment with reference to FIGS. 2A, 2B. Only differences of the third embodiment from the first embodiment will be explained.

The automatic cruise control system 1 of the third embodiment is similar to the automatic cruise control system 1 of the first embodiment except that the operation in step S120 of the target information generation process and the operation of the object position determination unit 374 are modified.

In the present embodiment, the signal processor 37, in step S120 of the target information generation process, determines a weighted mean of lateral positions of all the same-object peak pairs selected in step S110 as a lateral position of the preceding vehicle. The weighted mean is calculated by using, as weights, magnitudes of reflection wave received powers for the respective same-object peak pairs. Further in step S120, as in step S120 of the target information generation process of the first embodiment, the signal processor 37 determines a difference in lateral position between the rightmost peak pair and the leftmost peak pair as a width of the preceding vehicle. Still further, in step S120, the signal processor 37 extracts, on the basis of longitudinal positions of the peak pairs calculated in step S90, the forwardmost peak pair and the rearmost peak pair from the same-object peak pairs selected in step S110, and determines a difference in longitudinal position between the forwardmost peak pair and the rearmost peak pair as a length of the preceding vehicle. Thereafter, the process proceeds to step S130.

The object position determination unit 374, also in the present embodiment, is responsible for the operation in step S120 of the target information generation process.

In the radar apparatus 2 configured as above, not only targets on the rear portion of the preceding vehicle, but also targets in the interior of the preceding vehicle are used to calculate the lateral position of the preceding vehicle.

As described above, a lateral position of a target (corresponding to a peak pair) in the interior of the preceding vehicle is likely to lie at or around the lateral center of the preceding vehicle, i.e., the center of the width of the preceding vehicle. Hence, even though one of the rightmost and leftmost peak pairs is a target on the rear portion of the preceding vehicle and the other is a target in the interior of the preceding vehicle (such a situation is likely to occur during cornering of the preceding vehicle), the lateral position of the preceding vehicle calculated in step S120 is allowed to remain closer to the lateral center of the preceding vehicle as compared to the lateral position of the preceding vehicle simply defined by the lateral position of the representative peak pair. The lateral position of the preceding vehicle is thus corrected.

Hence, in spite of large variations in lateral position of a target on the rear portion of the preceding vehicle, variations in lateral position of the preceding vehicle calculated in step S120 can be reduced, which leads to reduction of variations in detected preceding vehicle position.

In addition, since the lateral position of the preceding vehicle is defined by a weighted mean of lateral positions of all the same-object peak pairs calculated by using, as weights, magnitudes of the reflection wave received powers for the respective same-object peak pairs, the lateral position of the preceding vehicle may reflect the magnitudes of the reflection wave received powers for the respective same-object peak pairs.

Fourth Embodiment

There will now be explained a fourth embodiment with reference to FIGS. 3A, 3B, FIG. 4A, and FIG. 4B. Only differences of the fourth embodiment from the first embodiment will be explained.

Figure 3B:
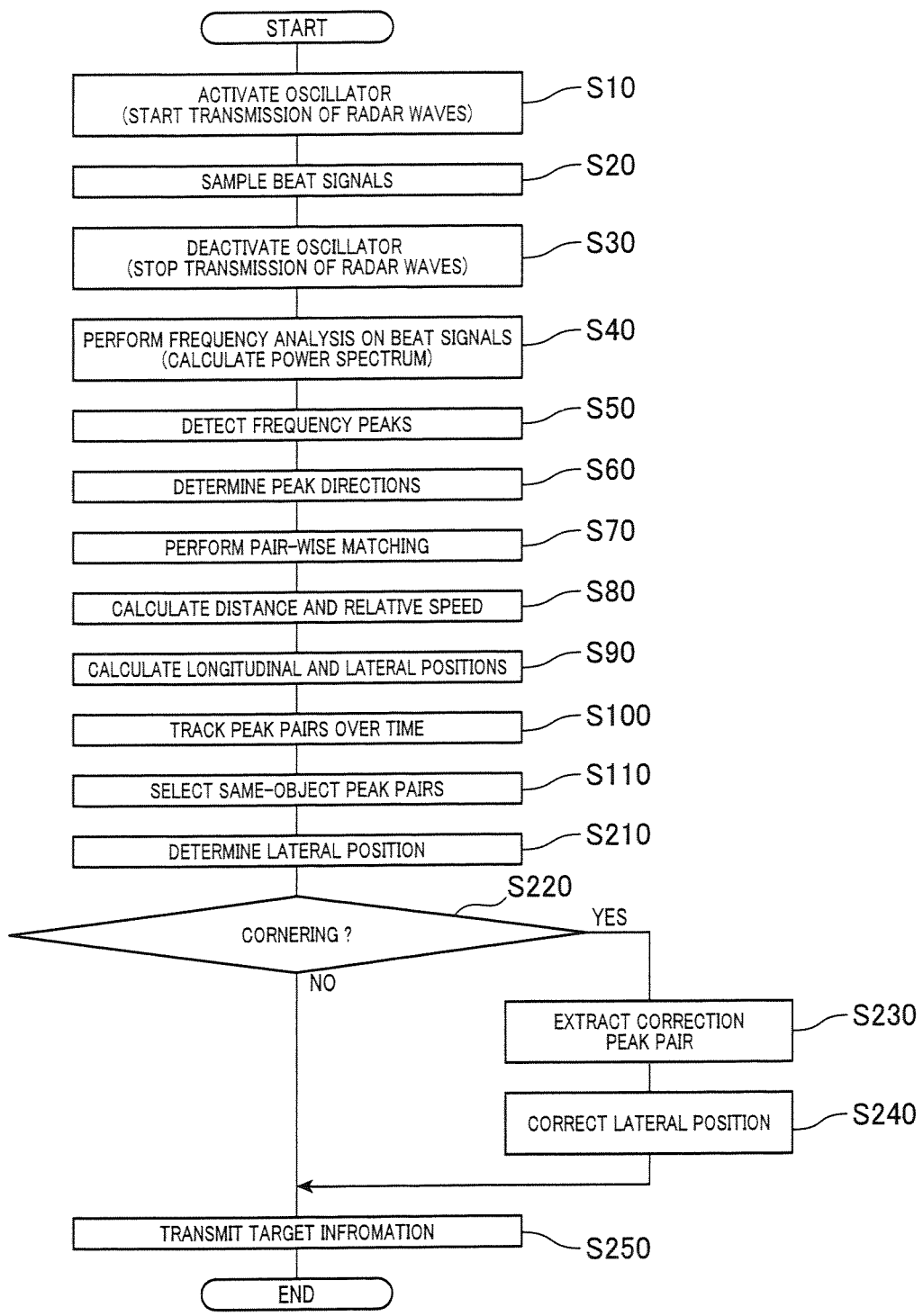
FIG. 3B shows a flowchart of a target information generation process performed in the signal processor in accordance with the fourth embodiment of the present invention.
Figure 4A:
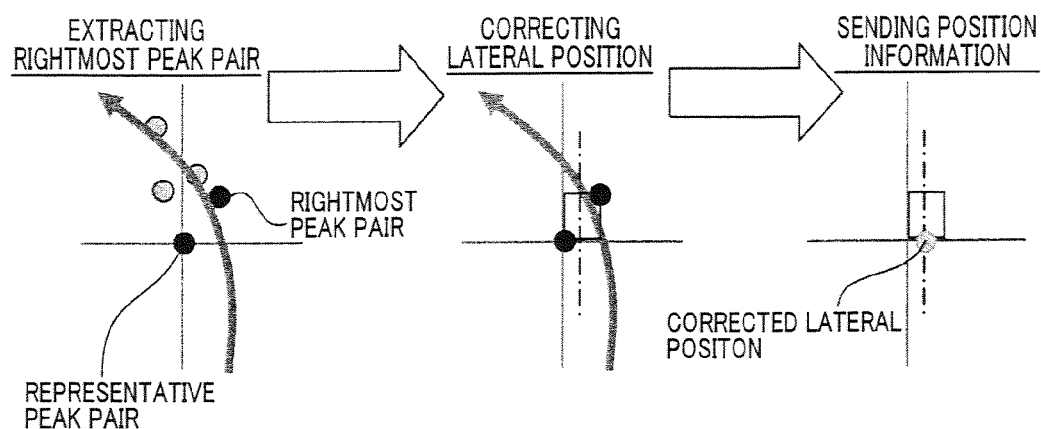
FIG. 4A shows a method of correcting a lateral position of a preceding vehicle in accordance with the fourth embodiment of the present invention.
Figure 4B:
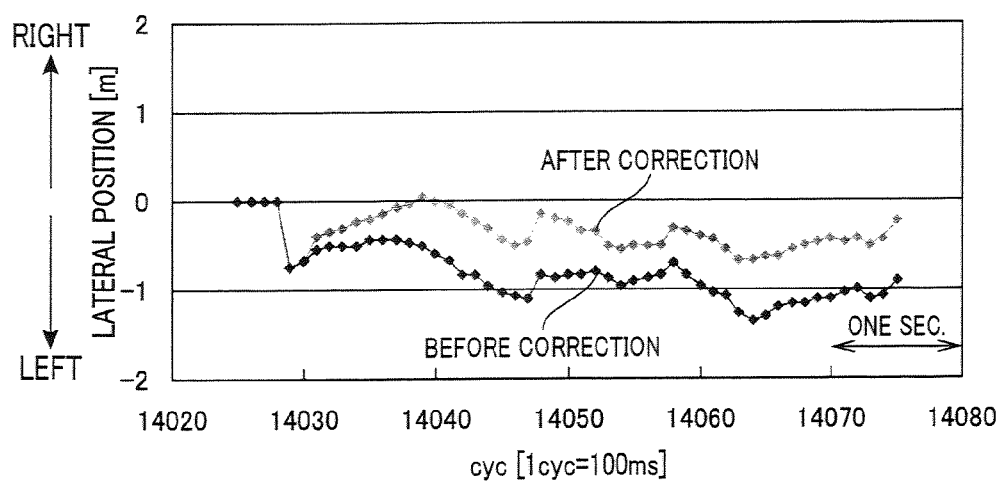
FIG. 4B shows a graph of the lateral position of the preceding vehicle versus time before and after correcting the lateral position of the preceding vehicle in accordance with the fourth embodiment of the present invention.

The automatic cruise control system 1 of the fourth embodiment is similar to the automatic cruise control system 1 of the first embodiment except that the target information generation process and the operations of the signal processor 37 are modified. FIG. 3A is a schematic block diagram of the signal processor 37 of the fifth embodiment. FIG. 3B is a flowchart of the target information generation process of the fourth embodiment. FIG. 4A shows an example method of correcting a lateral position of a preceding vehicle. FIG. 4B shows an exemplary graph of lateral position of the preceding vehicle versus time before and after correcting the lateral position of the preceding vehicle.

As shown in FIG. 3A, the signal processor 37 of the fourth embodiment is similar to the signal processor 37 of the first embodiment except that the object position determination unit 374 is modified and a cornering determination unit 375 and a second position determination inhibition unit 376 are added. As shown in FIG. 3B, the target information generation process of the fourth embodiment is similar to the target information generation process of the first embodiment except that steps S120 to S130 are removed and steps S210 to S250 are added.

Referring to FIG. 3B, in step S210 subsequent to step S110, the signal processor 37 determines a lateral position of the representative peak pair selected from the same-object peak pairs selected in step S110 as a lateral position of the preceding vehicle. The signal processor 37, as in the first embodiment, further determines a difference in lateral position between the rightmost peak pair as viewed from the own vehicle and the leftmost peak pair as viewed from the own vehicle as a width of the preceding vehicle.

Thereafter, in step S220, the signal processor 37 determines whether or not the own vehicle is cornering on the basis of a steering angle received from the distance ECU 3. If it is determined in step S220 that the own vehicle is not cornering, then the process proceeds to step S250.

If it is determined in step S220 that the own vehicle is cornering, then in step S230, the signal processor 37 extracts, from the same-object peak pairs selected in step S110, a correction peak pair (that is a peak pair used in correcting the lateral position of the preceding vehicle) in response to a cornering direction. More specifically, as shown in the left and central diagrams of FIG. 4A, when the own vehicle is cornering to the left, the signal processor 37 extracts the rightmost peak pair as the correction peak pair on the basis of the lateral positions calculated in step S90. On the other hand, when the own vehicle is cornering to the right, the signal processor 37 extracts the leftmost peak pair as the correction peak pair on the basis of the lateral positions calculated in step S90.

Subsequently, in step S240, the signal processor 37 corrects the lateral position of the preceding vehicle determined in step S210 to a center of the lateral position of the representative peak pair and the lateral position of the correction peak pair, as shown in the center and right diagrams of FIG. 4A. The signal processor 37 further determines a difference in lateral position between the representative peak pair and the correction peak pair as a width of the preceding vehicle. The process proceeds to step S250.

In step S250, the signal processor 37 generates target information including at least speed information indicative of a speed of the preceding vehicle relative to the own vehicle (relative speed), lateral position information indicative of the lateral position of the preceding vehicle, width information indicative of the width of the preceding vehicle, distance information indicative of the distance between the own vehicle and the representative peak pair, and sends the target information to the distance ECU 3. The process of this cycle is then ended.

Referring again to FIG. 3A, the signal processor 37 includes the target detection unit 371, the representative-target selection unit 372, the same-object target selection unit 373, the object position determination unit 374, the cornering determination unit 375, and the second position determination inhibition unit 376. The operation of these components will now be explained following the flow of the flowchart shown in FIG. 3B.

In the radar apparatus 2 configured as above, the target detection unit (as target detection means) 371 is responsible for the operation in step S90, where positions of targets reflecting radar waves emitted from the apparatus 2 (corresponding to respective peak pairs) are detected from the radar waves reflected from the targets.

The representative-target selection unit (as representative-target selection means) 372 is responsible for selecting the representative peak pair, i.e., a peak pair corresponding to a target closest to the own vehicle, from the peak pairs identified as a target in step S100.

The same-object target selection unit (as same-object target selection means) 373 is responsible for the operation in step S110, where peak pairs that fulfill the predetermined same-object target selection condition defined as above utilizing the representative peak pair selected by the representative-target selection unit 372 are selected from the peak pairs identified as a target in step S100.

The cornering determination unit (as cornering determination means) 375 is responsible for the operation in step S220, where it is determined whether or not the own vehicle is cornering on the basis of a steering angle received from the distance ECU 3.

The object position determination unit (as object position determination means) 374 is responsible for the operation in step S230, where, if it is determined that the own vehicle is cornering, then an endmost peak pair along a lateral direction opposite to the cornering direction is determined as the correction peak pair. The object position determination unit 374 is further responsible for the operation in step S240, where a center of the lateral position of the representative peak pair on the rear portion of the preceding vehicle and the lateral position of the endmost peak pair (correction peak pair) is determined as a lateral position of the preceding vehicle.

The second position determination inhibition unit (as second position determination inhibition means) 376 is responsible for, if it is determined in step 220 that the own vehicle is not cornering, inhibiting the object position determination unit 374 from calculating a center of the lateral position of the representative peak pair and the lateral position of the endmost peak pair as a lateral position of the preceding vehicle. The object position determination unit 374 then determines the lateral position of the representative peak pair as a lateral position of the preceding vehicle.

Hence, even when a lateral position of the target on the rear portion of the preceding vehicle varies in the cornering direction during cornering of the preceding vehicle, the lateral position of the preceding vehicle is corrected to a lateral position displaced in a direction opposite to the cornering direction, as shown in FIG. 4B, which leads to reduction of variations in detected preceding vehicle position during cornering.

Fifth Embodiment

There will now be explained a fifth embodiment with reference to FIGS. 5A, 5B. Only differences of the fifth embodiment from the fourth embodiment will be explained.

The automatic cruise control system 1 of the fifth embodiment is similar to the automatic cruise control system 1 of the fourth embodiment except that the target information generation process and the operations of the signal processor 37 are modified. FIG. 5A is a schematic block diagram of the signal processor 37 of the fifth embodiment. FIG. 5B is a flowchart of the target information generation process of the fifth embodiment.

Figure 5B:
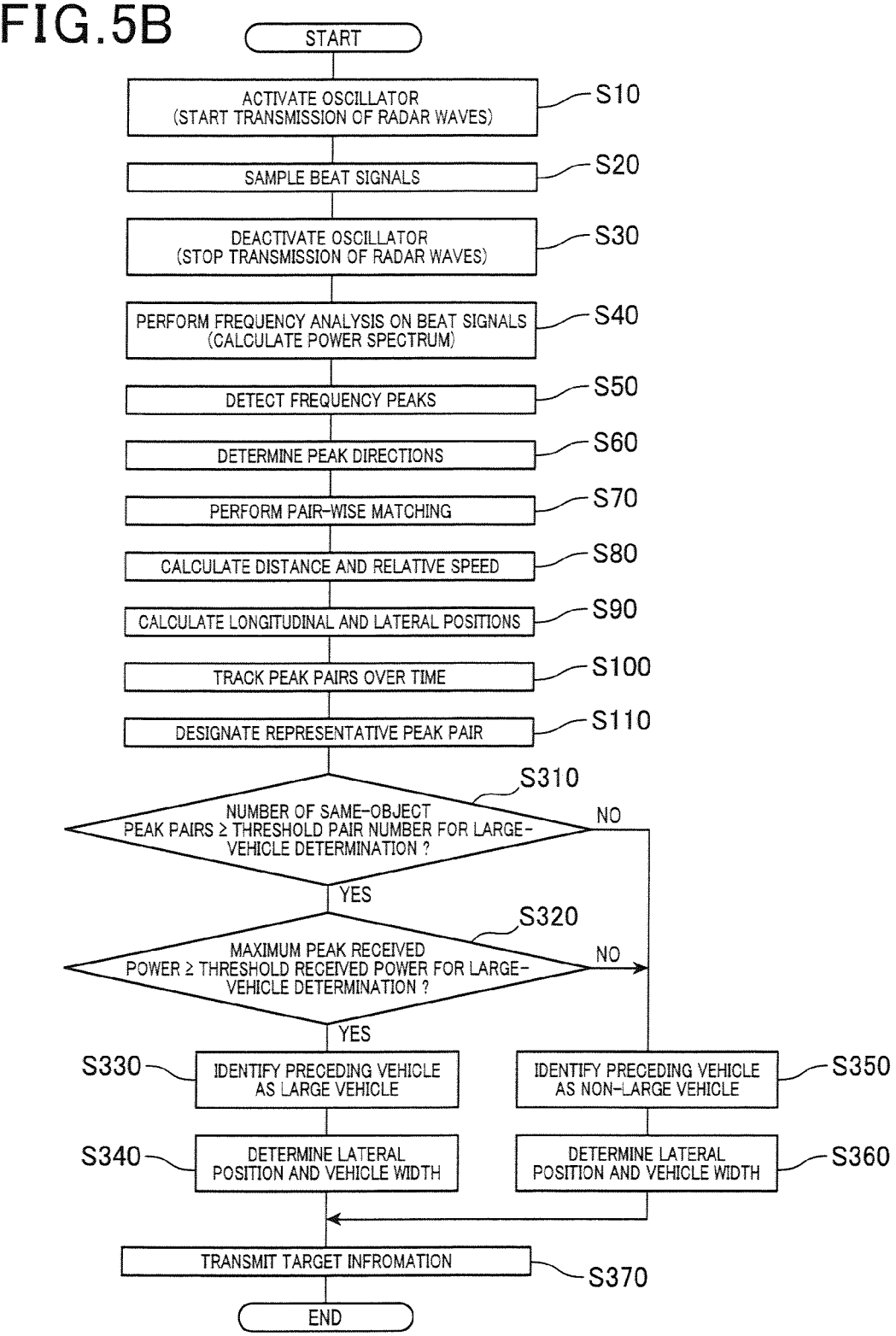
FIG. 5B shows a flowchart of a target information generation process performed in the signal processor in accordance with each of the fifth to seventh embodiments of the present invention.

As shown in FIG. 5A, the signal processor 37 of the fifth embodiment is similar to the signal processor 37 of the fourth embodiment except that the large-vehicle determination unit 377 and the first position determination inhibition unit 378 are added and the object position determination unit 374 is modified. As shown in FIG. 5B, the target information generation process of the fifth embodiment is similar to the target information generation process of the fourth embodiment except that steps S210 to S250 are removed and steps S310 to S370 are added.

Referring to FIG. 5B, in step S310 subsequent to step S110, the signal processor 37 determines whether or not the number of same-object peak pairs selected in step S110 (including the representative peak pair and hereinafter each referred to as a same-object peak pair) is equal to or greater than a predetermined threshold pair number for large vehicle determination.

If it is determined in step S310 that the number of same-object peak pairs is equal to or greater than the predetermined threshold pair number for large vehicle determination, then the process proceeds to step S320, where the signal processor 37 selects, from the same-object peak pairs selected in step S110, a same-object peak pair having a maximum frequency-peak intensity and determines whether or not a reflection wave received power for the selected same-object peak pair (hereinafter referred to as a maximum peak received power) is equal to or greater than a predetermined threshold received power for large vehicle determination.

If it is determined in step S320 that the maximum peak received power for the selected same-object peak pair is equal to or greater than the predetermined threshold received power for large vehicle determination, then the signal processor 37, in step S330, determines that the preceding vehicle is a large vehicle. Thereafter, in step S340, the signal processor 37 extracts, on the basis of lateral positions of the peak pairs calculated in step S90, the rightmost peak pair as viewed from the own vehicle and the leftmost peak pair as viewed from the own vehicle from the same-object peak pairs selected in step S110. The signal processor 37, in step S340, further determines a center of the lateral position of the rightmost peak pair and the lateral position of the leftmost peak pair as a lateral position of the preceding vehicle, and determines a difference in lateral position between the rightmost peak pair and the leftmost peak pair as a width of the preceding vehicle.

If it is determined in step S310 that the number of same-object peak pairs is less than the predetermined threshold pair number for large vehicle determination, or if it is determined in step S320 that the maximum peak received power for the selected same-object peak pair is less than the predetermined threshold received power for large vehicle determination, then in step S350, the signal processor 37 determines that the preceding vehicle is not a large vehicle. The signal processor 37, in step S360, further determines a lateral position of the representative peak pair selected from the same-object peak pairs selected in step S110 as a lateral position of the preceding vehicle. The signal processor 37, as in the first embodiment, further determines a difference in lateral position between the rightmost peak pair and the leftmost peak pair as a width of the preceding vehicle. The process then proceeds to step S370.

Subsequently, in step S370, the signal processor 37 generates target information including at least speed information indicative of a speed of the preceding vehicle relative to the own vehicle (relative speed), lateral position information indicative of the lateral position of the preceding vehicle, width information indicative of the width of the preceding vehicle, distance information indicative of the distance between the representative peak pair and the own vehicle, and sends the target information to the distance ECU 3. The process of this cycle is then ended.

Referring again to FIG. 5A, the signal processor 37 includes the target detection unit 371, the representative-target selection unit 372, the same-object target selection unit 373, the object position determination unit 374, the large-vehicle determination unit 377, and the first position determination inhibition unit 378. The operations of these components will now be explained following the flow of the flowchart shown in FIG. 5B.

In the radar apparatus 2 configured as above, the target detection unit (as target detection means) 371 is responsible for the operation in step S90, where positions of targets reflecting radar waves emitted from the apparatus 2 (corresponding to respective peak pairs) are detected from the radar waves reflected from the targets.

The representative-target selection unit (as representative-target selection means) 372 is responsible for selecting the representative peak pair, i.e., a peak pair corresponding to a target closest to the own vehicle, from the peak pairs identified as a target in step S100.

The same-object target selection unit (as same-object target selection means) 373 is responsible for the operation in step S110, where peak pairs that fulfill the predetermined same-object target selection condition defined as above utilizing the representative peak pair selected by the representative-target selection unit 372 are selected from the peak pairs identified as a target in step S100.

The large-vehicle determination unit (as large-vehicle determination means) 377 is responsible for the operation in step S310, where it is determined whether or not the number of same-object peak pairs (including the representative peak pair) is equal to or greater than the predetermined threshold pair number for large vehicle determination. The large-vehicle determination unit 377 is further responsible for the operation in step S320, where it is determined whether or not a maximum peak received power for the same-object peak pair having a maximum frequency-peak intensity is equal to or greater than the predetermined threshold received power for large vehicle determination.

The object position determination unit (as object position determination means) 374 is responsible for the operation in step S340, where a center of the lateral position of the rightmost peak pair as viewed from the own vehicle and the lateral position of the leftmost peak pair as viewed from the own vehicle is determined as a lateral position of the preceding vehicle determined to be a large vehicle in step S330. The object position determination unit 374 is further responsible for the operation in step S360, where, in the case of the preceding vehicle being a non-large vehicle, a lateral position of the representative peak pair that is determined as a lateral position of the preceding vehicle determined to be a non-large vehicle in step S350.

The first position determination inhibition unit (as first position determination inhibition means) 378 is responsible for, if it is determined in step 350 that the preceding vehicle is not a large vehicle, inhibiting the object position determination unit 374 from calculating a center of the lateral position of the rightmost peak pair and the lateral position of the leftmost peak pair as a lateral position of the preceding vehicle.

In the present embodiment, the object position determination unit 374 is allowed to implement the operation in step S340 unless inhibited by the first position determination inhibition unit 378.

This, in an environment where variations in lateral position of the preceding vehicle are ignorable due to the preceding vehicle being a non-large vehicle, can inhibit unnecessary calculation of the lateral position of the preceding vehicle as performed in step S340.

Sixth Embodiment

There will now be explained a sixth embodiment with reference to FIGS. 5A, 5B. Only differences of the sixth embodiment from the fifth embodiment will be explained.

The automatic cruise control system 1 of the sixth embodiment is similar to the automatic cruise control system 1 of the fifth embodiment except that the object position determination unit 374 and the operation in step S340 of the target information generation process are modified.

In the present embodiment, the signal processor 37, in step S340 subsequent to steps S310, S320, determines a mean of lateral positions of all the same-object peak pairs selected in step S110 as a lateral position of the preceding vehicle. As in step S340 of the target information generation process of the fifth embodiment, the signal processor 37, in step S340, further determines a difference in lateral position between the rightmost peak pair as viewed from the own vehicle and the leftmost peak pair as viewed from the own vehicle as a width of the preceding vehicle. Thereafter, the process proceeds to step S370.

The object position determination unit 374 is responsible for the operation in step S340 of the target information generation process.

This, in an environment where variations in lateral position of the preceding vehicle are ignorable due to the preceding vehicle being a non-large vehicle, can inhibit unnecessary calculation of the lateral position of the preceding vehicle performed in step 340.

Seventh Embodiment

There will now be explained a seventh embodiment with reference to FIGS. 5A, 5B. Only differences of the seventh embodiment from the fifth embodiment will be explained.

The automatic cruise control system 1 of the seventh embodiment is similar to the automatic cruise control system 1 of the fifth embodiment except that the object position determination unit 374 and the operation in step S340 of the target information generation process are modified.

In the present embodiment, the signal processor 37, in step S340 subsequent to steps S310, S320, determines a weighted mean of lateral positions of all the same-object peak pairs selected in step S110 as a lateral position of the preceding vehicle. The weighted mean is calculated by using, as weights, magnitudes of reflection wave received powers for the respective same-object peak pairs. As in step S340 of the target information generation process of the fifth embodiment, the signal processor 37, in step S340, further determines a difference in lateral position between the rightmost peak pair as viewed from the own vehicle and the leftmost peak pair as viewed from the own vehicle as a width of the preceding vehicle. Thereafter, the process proceeds to step S370.

The object position determination unit 374 is responsible for the operation in step S340 of the target information generation process.

This, in an environment where variations in lateral position of the preceding vehicle are ignorable due to the preceding vehicle being a non-large vehicle, can inhibit unnecessary calculation of the lateral position of the preceding vehicle performed in step 340.

Eighth Embodiment

There will now be explained an eighth embodiment with reference to FIGS. 5C, 5D. Only differences of the eighth embodiment from the fourth embodiment will be explained.

The automatic cruise control system 1 of the eighth embodiment is similar to the automatic cruise control system 1 of the fourth embodiment except that the target information generation process and the operations of the signal processor 37 are modified. FIG. 5C is a schematic block diagram of the signal processor 37 of the eighth embodiment. FIG. 5D is a flowchart of the target information generation process of the eighth embodiment.

Figure 5C:
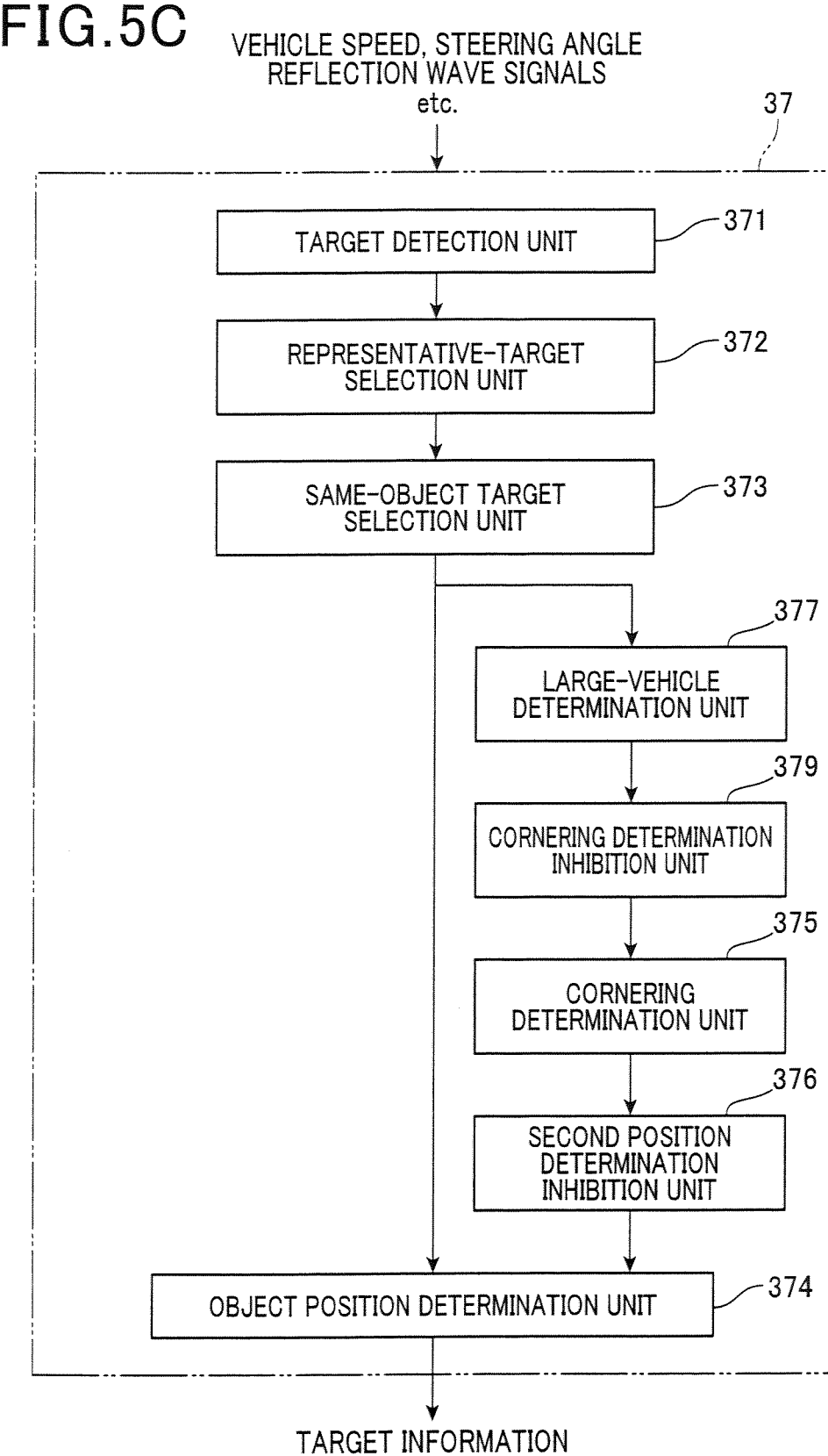
FIG. 5C shows a schematic block diagram of a signal processor of the radar apparatus in accordance with an eighth embodiment of the present invention.

As shown in FIG. 5C, the signal processor 37 of the eighth embodiment is similar to the signal processor 37 of the fourth embodiment except that a large-vehicle determination unit 377 and a cornering determination inhibition unit 379 are added. As shown in FIG. 5D, the target information generation process of the eighth embodiment is similar to the target information generation process of the fourth embodiment except that steps S310, S320, S330, and S350 are added.

Figure 5D:
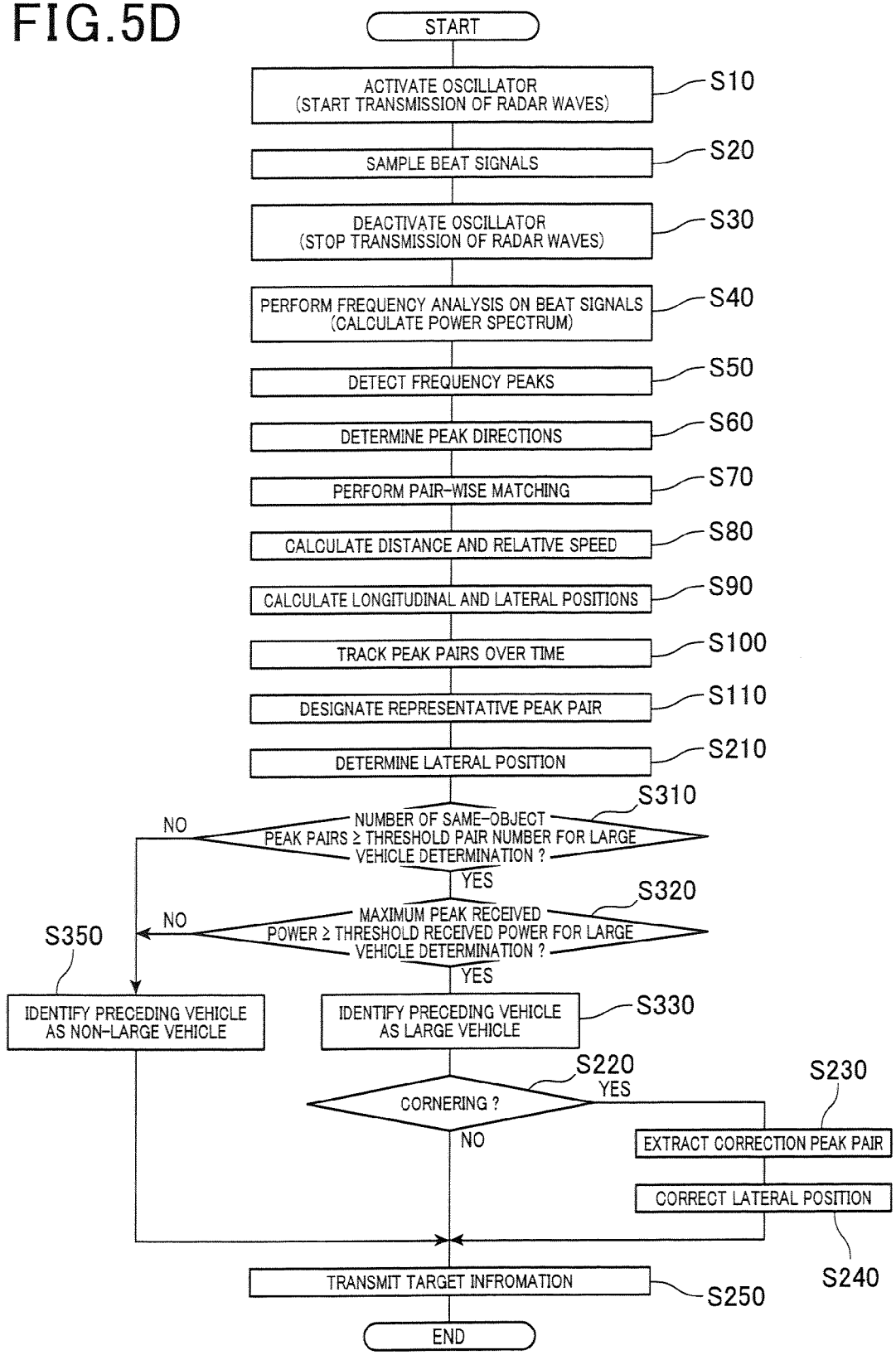
FIG. 5D shows a flowchart of a target information generation process performed in the signal processor in accordance with the eighth embodiment of the present invention.

Referring to FIG. 5D, in step S310 subsequent to step S210, the signal processor 37 determines whether or not the number of same-object peak pairs (including the representative peak pair) selected in step S110 is equal to or greater than a predetermined threshold pair number for large vehicle determination. If it is determined in step S310 that the number of same-object peak pairs is equal to or greater than the threshold pair number for large vehicle determination, then the process proceeds to step S320, where the signal processor 37 selects, from the same-object peak pairs selected in step S110, a same-object peak pair having a maximum frequency-peak intensity and determines whether or not a reflection wave received power for the selected same-object peak pair (referred to as a maximum peak received power) is equal to or greater than a predetermined threshold received power for large vehicle determination.

If it is determined in step S320 that a maximum peak received power for the selected same-object peak pair is equal to or greater than the predetermined threshold received power for large vehicle determination, then the signal processor 37, in step S330, determines that the preceding vehicle is a large vehicle. The process then proceeds to step S220.

On the other hand, if it is determined in step S310 that the number of same-object peak pairs is less than the threshold pair number for large vehicle determination, or if it is determined in step S320 that the maximum peak received power is less than the predetermined threshold received power for large vehicle determination, then in step S350, the signal processor 37 determines that the preceding vehicle is not a large vehicle. Thereafter, the process proceeds to step S250. Correcting the lateral position of the preceding vehicle, that is, the operation in step S240, is thus inhibited when the preceding vehicle is a large vehicle.

Referring again to FIG. 5C, the large-vehicle determination unit (as large-vehicle determination means) 377 is responsible for the operation in step S310, where it is determined whether or not the number of same-object peak pairs (including the representative peak pair) is equal to or greater than the predetermined threshold pair number for large vehicle determination. The large-vehicle determination unit 377 is further responsible for the operation in step S320, where it is determined whether or not a maximum peak received power for the same-object peak pair having a maximum frequency-peak intensity is equal to or greater than the predetermined threshold received power for large vehicle determination.

The cornering determination inhibition unit (as cornering determination inhibition means) 379 is responsible for, if it is determined in step 350 that the preceding vehicle is not a large vehicle, inhibiting the cornering determination unit 375 from determining whether or not the own vehicle is cornering.

The second position determination inhibition unit (as second position determination inhibition means) 376, unless it is determined by the cornering determination unit 375 that the own vehicle is cornering, inhibits the object position determination unit 374 from calculating a center of the lateral position of the representative peak pair and the lateral position of the endmost peak pair as a lateral position of the preceding vehicle.

This, in an environment where variations in lateral position of the preceding vehicle are ignorable due to the preceding vehicle being a non-large vehicle, can inhibit unnecessary calculation of the lateral position of the preceding vehicle performed during cornering in steps 220 to S240.

Some Modifications

There will now be explained some modifications of the above described embodiment that may be devised without departing from the spirit and scope of the present invention.

In the fifth embodiment, it is determined by using the number of same-object peak pairs and the maximum peak received power that the preceding vehicle is a large. Alternatively, it may be determined by using captured images forward of the own vehicle or the like that the preceding vehicle is a large.

In the fifth embodiment, it is determined that the preceding vehicle is a large vehicle when the number of same-object peak pairs is equal to or greater than the threshold pair number for large vehicle determination and the maximum peak received power is equal to or greater than the predetermined threshold received power for large vehicle determination. Alternatively, it may be determined that the preceding vehicle is a large vehicle when the number of same-object peak pairs is equal to or greater than the predetermined threshold pair number for large vehicle determination or when the maximum peak received power is equal to or greater than the predetermined threshold received power for large vehicle determination.

In the above embodiments, the same-object target selection condition for determining whether or not a peak pair belongs to the specific reflecting object is defined by utilizing a distance difference between a distance from the own vehicle to the peak pair and a distance from the own vehicle to the representative peak pair, a peak direction difference between a peak direction from the own vehicle to the peak pair and a peak direction from the own vehicle to the representative peak pair, and a relative speed difference between a speed of the peak pair relative to the own vehicle and a speed of the representative peak pair relative to the own vehicle. Alternatively, the same-object target selection condition may be defined by utilizing only the distance difference, only the peak direction difference, only the relative speed difference, or any combination of the distance difference, the peak direction difference, and the relative speed difference.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle-mounted radar apparatus for transmitting radar waves in a forward traveling direction of a vehicle mounting the apparatus thereon, the vehicle being hereinafter referred to as a radar-mounting vehicle, and receiving the radar waves reflected from an object to acquire information about the object, the apparatus comprising:
a target detection unit that transmits and receives the radar waves to detect positions of targets reflecting the radar waves;
a representative target selection unit that selects one of the targets detected by the target detection unit that fulfills a predetermined representative-target designation condition for designating a representative of the targets detected by the target detection unit;
a same-object target selection unit that selects, from the targets detected by the target detection unit, targets that fulfill a predetermined same-object target selection condition for determining which of the targets detected by the target detection unit belongs to the same object as the representative target, the representative target and the targets selected by the same-object target selection unit other than the representative target forming together a same-object target group, and the object that each target of the same-object target group belongs to being referred to as a specific reflecting object; and
an object position determination unit that calculates a value of a predefined function of lateral positions of two or more targets of the same-object target group as a lateral position, along a vehicle-width direction of the radar-mounting vehicle, of the specific reflecting object,
a large-vehicle determination unit that determines whether or not the specific reflecting object is a large vehicle; and
a first position determination inhibition unit that, when it is determined by the large-vehicle determination unit that the specific reflecting object is not a large vehicle, inhibits the object position determination unit from calculating the predefined function of lateral positions of two or more targets of the same-object target group as the lateral position of the specific reflecting object, and
the object position determination unit is configured to, when inhibited by the first position determination inhibition unit from calculating the predefined function of lateral positions of two or more targets of the same-object target group as the lateral position of the specific reflecting object, determine a lateral position of the representative target as the lateral position of the specific reflecting object.

2. The apparatus of claim 1, wherein the large-vehicle determination unit determines whether or not a number of targets of the same-object target group is equal to or greater than a predetermined threshold target number for large-vehicle determination, and when it is determined that the number of targets of the same-object target group is equal to or greater than the predetermined threshold target number for large-vehicle determination, determines that the specific reflecting object is a large vehicle.

3. The apparatus of claim 1, wherein the object position determination unit selects, from the targets of the same-object target group, a rightmost target as viewed from the radar-mounting vehicle and a leftmost target as viewed from the radar-mounting vehicle, and calculates a center of a lateral position of the rightmost target and a lateral position of the leftmost target as the lateral position of the specific reflecting object.

4. The apparatus of claim 1, wherein the object position determination unit calculates a mean of lateral positions of all the targets of the same-object target group as the lateral position of the specific reflecting object.

5. The apparatus of claim 4, wherein the object position determination unit calculates a weighted mean of lateral positions of all the targets of the same-object target group as the lateral position of the specific reflecting object, and the weighted mean is determined by using, as weights, magnitudes of reflection wave received powers for the respective targets of the same-object target group.

6. The apparatus of claim 1, further comprising a cornering determination unit that determines whether or not the radar-mounting vehicle is cornering, the object position determination unit, when it is determined by the cornering determination unit that the radar-mounting vehicle is cornering, calculates a value of the predefined function as the lateral position of the specific reflecting object, the function being defined such that the lateral position of the specific reflecting object is displaced in a direction opposite to a cornering direction from a lateral position of the representative target.

7. The apparatus of claim 6, wherein the object position determination unit, when it is determined by the cornering determination unit that the radar-mounting vehicle is cornering, extracts, from the targets of the same-object group, an endmost target along a lateral direction opposite to a cornering direction of the radar-mounting vehicle, and further calculates a center of a lateral position of the representative target and a lateral position of the endmost target as the lateral position of the preceding vehicle.

8. The apparatus of claim 6, further comprising a second position determination inhibition unit that, when it is determined by the cornering determination unit that the radar-mounting vehicle is not cornering, inhibits the object position determination unit from calculating the value of the predefined function as the lateral position of the specific reflecting object.

9. The apparatus of claim 1, wherein the predetermined same-object target selection condition comprises at least one of:
a first condition that a difference in distance from the radar-mounting vehicle between the target and the representative target is equal to or less than a predetermined threshold value of distance difference;
a second condition that a difference in peak direction from the radar-mounting vehicle between the target and the representative target is equal to or less than a predetermined threshold value of peak direction difference; and
a third condition that a difference in relative speed from the radar-mounting vehicle between the target and the representative target is equal to or less than a predetermined threshold value of relative speed difference.

10. The apparatus of claim 1, wherein the predetermined representative-target designation condition states that the representative target is a target, of the targets detected by the target detection unit, closest to the radar-mounting vehicle.

11. The apparatus of claim 1, wherein the predetermined representative-target designation condition states that the representative target is a target, of the targets detected by the target detection unit, having a maximum frequency-peak intensity in a power spectrum of reflection waves.

12. A vehicle-mounted radar apparatus for transmitting radar waves in a forward traveling direction of a vehicle mounting the apparatus thereon, the vehicle being hereinafter referred to as a radar-mounting vehicle, and receiving the radar waves reflected from an object to acquire information about the object, the apparatus comprising:
a target detection unit that transmits and receives the radar waves to detect positions of targets reflecting the radar waves;
a representative target selection unit that selects one of the targets detected by the target detection unit that fulfills a predetermined representative-target designation condition for designating a representative of the targets detected by the target detection unit;
a same-object target selection unit that selects, from the targets detected by the target detection unit, targets that fulfill a predetermined same-object target selection condition for determining which of the targets detected by the target detection unit belongs to the same object as the representative target, the representative target and the targets selected by the same-object target selection unit other than the representative target forming together a same-object target group, and the object that each target of the same-object target group belongs to being referred to as a specific reflecting object;
an object position determination unit that calculates a value of a predefined function of lateral positions of two or more targets of the same-object target group as a lateral position, along a vehicle-width direction of the radar-mounting vehicle, of the specific reflecting object,
a large-vehicle determination unit that determines whether or not the specific reflecting object is a large vehicle; and
a first position determination inhibition unit that, when it is determined by the large-vehicle determination unit that the specific reflecting object is not a large vehicle, inhibits the object position determination unit from calculating the predefined function of lateral positions of two or more targets of the same-object target group as the lateral position of the specific reflecting object,
wherein the large-vehicle determination unit determines whether or not a reflection wave received power for one of the targets of the same-object target group that fulfills a predetermined target selection condition for selecting a target used by the large-vehicle determination unit to determine whether or not the specific reflecting object is a large vehicle is equal to or greater than a predetermined threshold received power for large-vehicle determination, and when it is determined that the reflection wave received power for the target that fulfills the predetermined target selection condition is equal to or greater than the predetermined threshold received power for large-vehicle determination, determines that the specific reflecting object is a large vehicle, and
the predetermined target selection condition states that the target used by the large-vehicle determination unit to determine whether or not the specific reflecting object is a large vehicle is a target, of the same-object target group, having a maximum frequency-peak intensity in a power spectrum of reflection waves.

13. A vehicle-mounted radar apparatus for transmitting radar waves in a forward traveling direction of a vehicle mounting the apparatus thereon, the vehicle being hereinafter referred to as a radar-mounting vehicle, and receiving the radar waves reflected from an object to acquire information about the object, the apparatus comprising:
a target detection unit that transmits and receives the radar waves to detect positions of targets reflecting the radar waves;
a representative target selection unit that selects one of the targets detected by the target detection unit that fulfills a predetermined representative-target designation condition for designating a representative of the targets detected by the target detection unit;
a same-object target selection unit that selects, from the targets detected by the target detection unit, targets that fulfill a predetermined same-object target selection condition for determining which of the targets detected by the target detection unit belongs to the same object as the representative target, the representative target and the targets selected by the same-object target selection unit other than the representative target forming together a same-object target group, and the object that each target of the same-object target group belongs to being referred to as a specific reflecting object;
an object position determination unit that calculates a value of a predefined function of lateral positions of two or more targets of the same-object target group as a lateral position, along a vehicle-width direction of the radar-mounting vehicle, of the specific reflecting object, a large-vehicle determination unit that determines whether or not the specific reflecting object is a large vehicle; and a first position determination inhibition unit that, when it is determined by the large-vehicle determination unit that the specific reflecting object is not a large vehicle, inhibits the object position determination unit from calculating the predefined function of lateral positions of two or more targets of the same-object target group as the lateral position of the specific reflecting object, wherein the large-vehicle determination unit determines whether or not a number of targets of the same-object target group is equal to or greater than a predetermined threshold target number for large-vehicle determination, and when it is determined that the number of targets of the same-object target group is equal to or greater than the predetermined threshold target number for large-vehicle determination, further determines whether or not a reflection wave received power for one of the targets of the same-object target group that fulfills a predetermined target selection condition for selecting a target used by the large-vehicle determination unit to determine whether or not the specific reflecting object is a large vehicle is equal to or greater than a predetermined threshold received power for large-vehicle determination, and when it is determined that the reflection wave received power for the target that fulfills the predetermined target selection condition is equal to or greater than the predetermined threshold received power for large-vehicle determination, determines that the specific reflecting object is a large vehicle, and the predetermined target selection condition states that the target used by the large-vehicle determination unit to determine whether or not the specific reflecting object is a large vehicle is a target, of the same-object target group, having a maximum frequency-peak intensity in a power spectrum of reflection waves.

* * * * *